(12) United States Patent
Nishimura et al.

(10) Patent No.: US 8,528,434 B2
(45) Date of Patent: *Sep. 10, 2013

(54) MANUAL TRANSMISSION FOR VEHICLE

(75) Inventors: Shigeto Nishimura, Handa (JP); Hiroyuki Suzuki, Nishio (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 480 days.

This patent is subject to a terminal disclaimer.

(21) Appl. No.: 12/857,658

(22) Filed: Aug. 17, 2010

(65) Prior Publication Data

US 2011/0048149 A1     Mar. 3, 2011

(30) Foreign Application Priority Data

Aug. 19, 2009   (JP) ................... 2009-189966

(51) Int. Cl.
   *F16H 3/08*      (2006.01)
   *F16H 59/00*     (2006.01)

(52) U.S. Cl.
   USPC ............................................. 74/331; 74/325

(58) Field of Classification Search
   USPC .................... 74/331, 330, 339, 340, 325
   See application file for complete search history.

(56) References Cited

U.S. PATENT DOCUMENTS

| | | | |
|---|---|---|---|
| 4,799,395 A * | 1/1989 | Janiszewski | 74/331 |
| 5,311,789 A * | 5/1994 | Henzler et al. | 74/331 |
| 6,619,150 B2 * | 9/2003 | Suzuki et al. | 74/331 |
| 6,990,871 B2 * | 1/2006 | Ebenhoch | 74/74 |
| 7,124,659 B2 * | 10/2006 | Gumpoltsberger et al. | 74/331 |
| 8,033,194 B2 * | 10/2011 | Suzuki | 74/331 |
| 2006/0058147 A1 | 3/2006 | Sander et al. | |
| 2006/0230854 A1 * | 10/2006 | Enstrom et al. | 74/331 |
| 2007/0277633 A1 * | 12/2007 | Burgardt et al. | 74/331 |
| 2009/0065283 A1 * | 3/2009 | Suzuki | 180/374 |

FOREIGN PATENT DOCUMENTS

| | | |
|---|---|---|
| DE | 103 26 865 A1 | 12/2004 |
| EP | 0 540 989 A1 | 5/1993 |
| EP | 1 731 794 A1 | 12/2006 |
| EP | 2 036 758 A2 | 3/2009 |
| FR | 2 726 619 A1 | 5/1996 |
| JP | 2543874 | 7/1996 |
| WO | 2007/098842 A1 | 9/2007 |

OTHER PUBLICATIONS

U.S. Appl. No. 12/857,649, filed Aug. 17, 2010, Nishimura et al.

* cited by examiner

*Primary Examiner* — Ha D Ho
*Assistant Examiner* — Jude Agendia
(74) *Attorney, Agent, or Firm* — Burr & Brown

(57) ABSTRACT

A six speed M/T includes four shafts, which are an input shaft A1, a first intermediate shaft A2, a second intermediate shaft A3, and an output shaft A4, those being parallel to one another. A single drive gear G46$i$ is used as both a fourth-speed drive gear and a sixth-speed drive gear. The number of gear teeth of a second final drive gear Gfi2 is greater than that of a first final drive gear Gfi1. A third-speed driven gear G3$o$, a fourth-speed driven gear G4$o$, a first-speed driven gear G1$o$, and a second-speed driven gear G2$o$ are arranged to the shaft A2 in this order from the side close to an engine E/G, and a fifth-speed driven gear G5$o$, a sixth-speed driven gear G6$o$, and a reverse driven gear GRo are arranged to the shaft A3 in this order from the side close to the engine E/G.

4 Claims, 20 Drawing Sheets

First speed

Up ↑
Left (right) ← → Right (left)
↓ Down

First speed

Second speed

Third speed

Third speed

Fourth speed

Fourth speed

Fifth speed

Fifth speed

Sixth speed

Sixth speed

MANUAL TRANSMISSION FOR VEHICLE

BACKGROUND OF THE INVENTION

1. Field of the Invention

The present invention relates to a vehicle manual transmission, and more particularly to the one having 6 shift stages for a forward travel and 1 shift stage for a reverse travel.

2. Description of Related Art

There has conventionally been known the one disclosed in Japanese Patent No. 2543874 as a vehicle manual transmission (hereinafter referred to as "M/T") having plural shift stages for a forward travel and 1 shift stage for a reverse travel. In this type of M/T, an input shaft that forms a power transmission system with an output shaft of an engine, an output shaft that forms a power transmission system with drive wheels, and 2 intermediate shafts (a first intermediate shaft and a second intermediate shaft) are supported by a housing so as to be parallel to one another and so as to be capable of rotating.

Drive gears for the plural shift stages for the forward travel are coaxially fixed to the input shaft in such a manner that they cannot make relative rotation. Driven gears of some of the plural shift stages, which are always meshed with the drive gears of the above-mentioned some of the plural shift stages for the forward travel (e.g., plural shift stages at the lower speed), are arranged coaxially to the first intermediate shaft so as to be capable of making relative rotation. A first final drive gear is coaxially fixed to the first intermediate shaft in such a manner that it cannot make a relative rotation.

Similarly, driven gears of the remaining plural shift stages, which are always meshed with the drive gears of the remaining plural shift stages (e.g., the plural shift stages at the higher speed) of the plural shift stages for the forward travel, are coaxially arranged to the second intermediate shaft so as to be capable of making relative rotation. A second final drive gear is coaxially fixed to the second intermediate shaft in such a manner that it cannot make a relative rotation.

A final driven gear, which is always meshed with the first and the second final drive gears, is coaxially fixed to the output shaft in such a manner that it cannot make relative rotation. When the driven gear, corresponding to the shift stage for the forward travel selected through a driver's operation by a shift lever, is fixed to the intermediate shaft, to which the driven gear is mounted, in such a manner that it cannot rotate relative to the intermediate shaft, a speed reducing ratio (=ratio of the rotation speed of the input shaft to the rotation speed of the output shaft) corresponding to the selected shift stage for the forward travel is acquired when a vehicle travels forward.

Further, a drive gear for the reverse travel is coaxially and integrally fixed to the first-speed driven gear arranged at the first intermediate shaft. The driven gear for the reverse travel, which is always meshed with the drive gear for the reverse travel, is coaxially arranged to the second intermediate shaft so as to be capable of making a relative rotation. When the driven gear for the reverse travel is fixed to the second intermediate shaft so as not to be capable of making a relative rotation, which is executed corresponding to the selection of the reverse travel through the driver's operation to the shift lever, the second intermediate shaft inversely rotates, whereby the vehicle can be backed.

As described above, in the M/T of this type, the drive gear for the reverse travel and the driven gear for the reverse travel are respectively arranged at the first and the second intermediate shafts. Therefore, the M/T of this type does not need a rotation shaft (a third rotation shaft) exclusively used only for arranging the gear for the reverse travel. Additionally, the driven gears for the plural shift stages for the forward travel are arranged separately to the first and the second intermediate shafts. Therefore, compared to the case in which all driven gears for the plural shift stages for the forward travel are coaxially arranged to a single intermediate shaft, the total length of the M/T in the axial direction can be reduced. Accordingly, a compact M/T having a short length in the axial direction can be obtained.

SUMMARY OF THE INVENTION

In a front-wheel-drive vehicle (a so-called FF vehicle) in which an engine is arranged at the front side of the vehicle, the engine (the output shaft of the engine) is generally arranged to the vehicle sideways. An input shaft of the M/T is coaxially connected to the output shaft of the engine through a clutch. Therefore, in the FF vehicle having the engine arranged sideways, the M/T is arranged at the side of the engine through the clutch in order that the shafts of the M/T are arranged sideways with respect to the vehicle as illustrated in FIG. 21. Specifically, an assembly including the engine, the clutch, and the M/T is arranged sideways in a space between right and left side frames (see a hatched portion in FIG. 21), which is relatively narrow, in an engine room in a vehicle. Accordingly, the demand for shortening the total length of the M/T in the axial direction is significantly high.

From the above, the M/T of the above-mentioned type (the type including four shafts that are the input shaft, the output shaft, and the first and the second intermediate shafts) is suitable for the FF vehicle having the engine arranged sideways. Of the M/T of this type, the one having 6 shift stages (first speed to sixth speed) for the forward travel (six speed M/T) will be considered below.

A side frame of a vehicle has been increased in size and straightened for the purpose of enhancing a crash safety of a vehicle and enhancing a rigidity of a vehicle body. Therefore, as illustrated in FIG. 21, the space between right and left side frames in an engine room is more decreased (see the dotted portion in FIG. 21). Accordingly, the interference between the end of the housing of the M/T at the side opposite to the engine and the side frame is likely to occur. When the positions of the ends of the input shaft and the first and second intermediate shafts at the side opposite to the engine are substantially equal to one another as illustrated in FIG. 21, in particular, the position of the end of the housing of the M/T at the side opposite to the engine in the lateral direction is likely to be substantially fixed in the vertical direction. In this case, the interference between one of the upper side of the end and the lower side of the end and the side frame is likely to occur (in FIG. 21, the interference between the upper side of the end and the side frame occurs). The interference described above is easy to be avoided by shortening the length of one of the first and second intermediate shafts (in FIG. 21, the length of the second intermediate shaft).

On the other hand, the difference (ratio) in the speed reducing ratio between the first speed (the shift stage for the lowest speed) and the sixth speed (the shift stage for the highest speed) is increased (specifically, making the speed reducing ratio wide) in order to enhance fuel economy.

In view of the above-mentioned circumstances, the present invention aims to provide a six speed M/T of a type having four shafts, which are an input shaft, an output shaft, and a first and second intermediate shafts, wherein the length of one of the first and the second intermediate shafts can particularly be shortened, and the speed reducing ratio can be made wide.

The vehicle manual transmission (six speed M/T) according to the present invention includes a housing, an input shaft, a first intermediate shaft, a second intermediate shaft, and an output shaft. The input shaft is supported by the housing so as to be capable of rotating, and that forms a power transmission system with an output shaft of an engine. First-speed to sixth-speed drive gears for the forward travel are respectively fixed to the input shaft coaxially in such a manner that they cannot make relative rotation.

The first intermediate shaft is rotatably supported by the housing so as to be parallel to the input shaft at the position eccentric from the input shaft. First-speed to fourth-speed driven gears for the forward travel, which are respectively always meshed with the first-speed to the fourth-speed drive gears for the forward travel, are coaxially arranged to the first intermediate shaft so as to be capable of making relative rotation. Further, a first final drive gear is coaxially fixed to the first intermediate shaft in such a manner that it cannot make relative rotation.

The second intermediate shaft is eccentric from the input shaft, and is rotatably supported by the housing so as to be parallel to the input shaft at the position above or below the first intermediate shaft in a state in which the manual transmission is mounted to a vehicle. Fifth-speed and sixth-speed driven gears for the forward travel, which are respectively always meshed with the fifth-speed and the sixth-speed drive gears for the forward travel, are coaxially arranged to the second intermediate shaft so as to be capable of making relative rotation. A driven gear for a reverse travel, which is always meshed with a drive gear for the reverse travel that coaxially and integrally rotates with the first-speed driven gear for the forward travel, is coaxially arranged to the second intermediate shaft in such a manner that it cannot make relative rotation. A second final drive gear is coaxially fixed to the second intermediate shaft in such a manner that it cannot make relative rotation.

The output shaft is rotatably supported by the housing so as to be parallel to the input shaft at the position eccentric from the input shaft, and forms the power transmission system with the drive wheel. A final driven gear that is always meshed with the first and second final drive gears is coaxially arranged to the output shaft.

The six speed M/T according to the present invention includes first to fourth switching mechanisms. The first switching mechanism can selectively employ one of a non-connected state in which the first-speed and second-speed driven gears can rotate relative to the first intermediate shaft, a first-speed state in which the first-speed driven gear cannot rotate relative to the first intermediate shaft and the second-speed driven gear can rotate relative to the first intermediate shaft, and a second-speed state in which the first-speed driven gear can rotate relative to the first intermediate shaft and the second-speed driven gear cannot rotate relative to the first intermediate shaft. When the first-speed state is employed, the speed reducing ratio for the first speed is obtained, when the vehicle travels forward. When the second-speed state is employed, the speed reducing ratio for the second speed is obtained, when the vehicle travels forward.

The second switching mechanism can selectively employ one of a non-connected state in which the third-speed and fourth-speed driven gears can rotate relative to the first intermediate shaft, a third-speed state in which the third-speed driven gear cannot rotate relative to the first intermediate shaft and the fourth-speed driven gear can rotate relative to the first intermediate shaft, and a fourth-speed state in which the third-speed driven gear can rotate relative to the first intermediate shaft and the fourth-speed driven gear cannot rotate relative to the first intermediate shaft. When the third-speed state is employed, the speed reducing ratio for the third speed is obtained, when the vehicle travels forward. When the fourth-speed state is employed, the speed reducing ratio for the fourth speed is obtained, when the vehicle travels forward.

The third switching mechanism can selectively employ one of a non-connected state in which the fifth-speed and sixth-speed driven gears can rotate relative to the second intermediate shaft, a fifth-speed state in which the fifth-speed driven gear cannot rotate relative to the second intermediate shaft and the sixth-speed driven gear can rotate relative to the second intermediate shaft, and a sixth-speed state in which the fifth-speed driven gear can rotate relative to the second intermediate shaft and the sixth-speed driven gear cannot rotate relative to the second intermediate shaft. When the fifth-speed state is employed, the speed reducing ratio for the fifth speed is obtained, when the vehicle travels forward. When the sixth-speed state is employed, the speed reducing ratio for the sixth speed is obtained, when the vehicle travels forward.

The fourth switching mechanism can selectively employ one of a non-connected state in which the drive gear for the reverse travel can rotate relative to the second intermediate shaft, and a reverse state in which the driven gear for the reverse travel cannot rotate relative to the second intermediate shaft. When the reverse state is employed, the second intermediate shaft inversely rotates, whereby the vehicle can be backed.

The feature of the six speed M/T according to the present invention is such that a single drive gear, that is coaxially fixed to the input shaft in such a manner that it cannot rotate relative to the input shaft, is used as both the fourth-speed drive gear and the sixth-speed drive gear (feature 1), the number of the gear teeth of the second final drive gear is greater than the number of the gear teeth of the first final drive gear (feature 2), and the third-speed driven gear, the fourth-speed driven gear, the first-speed driven gear, and the second-speed driven gear are arranged in this order from the side close to the engine in the axial direction of the first intermediate shaft, in a state in which the manual transmission is mounted to the vehicle, while the fifth-speed driven gear, the sixth-speed driven gear, and the driven gear for the reverse travel are arranged in this order in the axial direction of the second intermediate shaft from the side close to the engine, in a state in which the manual transmission is mounted to the vehicle (feature 3).

Here, the first final drive gear can be arranged at the side closer to the engine than the third-speed driven gear in the axial direction of the first intermediate shaft in a state in which the manual transmission is mounted to the vehicle, and the second final drive gear can be arranged at the side closer to the engine than the fifth-speed driven gear in the axial direction of the second intermediate shaft in a state in which the manual transmission is mounted to the vehicle.

According to the above-mentioned (feature 1), the number of the gears coaxially fixed to the input shaft can be reduced by one, whereby the length of the input shaft can be shortened. Further, the fourth-speed drive gear and the sixth-speed drive gear are selected as the combination of two drive gears, which are to be the subject shared by the single drive gear, whereby the range of the type (displacement, vehicle class) of the vehicle to which the six speed M/T of the present invention can be mounted is increased (this will be described later).

According to the (feature 2), the final speed reducing ratio between the first intermediate shaft to which the first-speed driven gear is arranged and the output shaft (the ratio of the rotation speed of the first intermediate shaft to the rotation speed of the output shaft, a first final speed reducing ratio) is greater than the final speed reducing ratio (the ratio of the rotation speed of the second intermediate shaft to the rotation speed of the output shaft, a second final speed reducing ratio) between the second intermediate shaft to which the sixth-speed driven gear is arranged and the output shaft. As a result, it is easy to design that the difference (ratio) between the speed reducing ratio of the first speed and the speed reducing ratio of the sixth speed increases. Specifically, making the speed reducing ratio of the M/T wide is easy to be attained.

According to the (feature 3), it is easy to set the length of the second intermediate shaft (specifically, the upper or the lower intermediate shaft in a state in which the manual transmission is mounted to a vehicle) of the first and the second intermediate shafts to be particularly short (this will be described later). Further, it becomes easy to design that a moving direction (specifically, in the direction from the side close to the engine toward the side apart from the engine in the axial direction) of a moving member in each switching mechanism during the shift from the first speed to the second speed, the shift from the third speed to the fourth speed, and the shift from the fifth speed to the sixth speed becomes the same (this will also be described later). Therefore, the number of links linking the shift lever and the respective switching mechanisms can be reduced.

As described above, according to the six speed M/T having four shafts, which are the input shaft, the output shaft, the first intermediate shaft, and the second intermediate shaft, the length of the second intermediate shaft (specifically, the upper or the lower intermediate shaft in a state in which the manual transmission is mounted to a vehicle) of the first and the second intermediate shafts can be particularly decreased, and the speed reducing ratio can be made wide.

In the six speed M/T according to the present invention, it is preferable that the drive gear for the reverse travel is arranged between the first-speed driven gear and the fourth-speed driven gear in the axial direction of the first intermediate shaft. With this structure, the position of the driven gear for the reverse travel that is meshed with the drive gear for the reverse travel can be set to the side close to the engine, compared to the case in which the drive gear for the reverse travel is arranged between the first-speed driven gear and the second-speed driven gear. Accordingly, the length of the second intermediate shaft can more be decreased.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE INVENTION

A vehicle manual transmission according to an embodiment of the present invention will be described below with reference to the drawings. A manual transmission M/T according to the embodiment of the present invention has 6 shift stages (first speed to sixth speed) for a forward travel and 1 shift stage (reverse) for a reverse travel. It is particularly applied to an FF vehicle in which an engine (an output shaft of the engine) is arranged sideways with respect to a vehicle.

Figure 1:
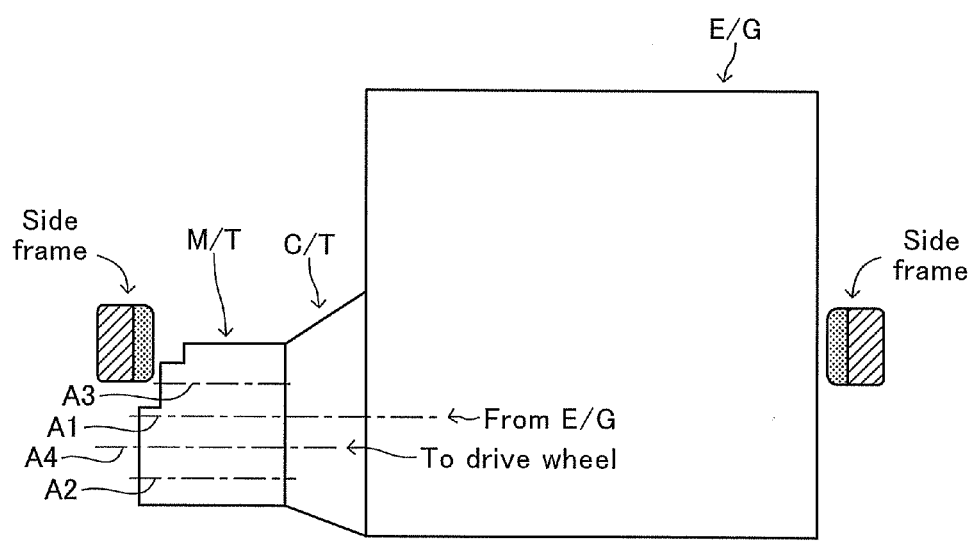
FIG. 1 is a schematic diagram illustrating a state in which an assembly including an engine, a clutch, and a manual transmission according to an embodiment of the present invention is arranged sideways between right and left side frames in an engine room of a vehicle.
Figure 2:
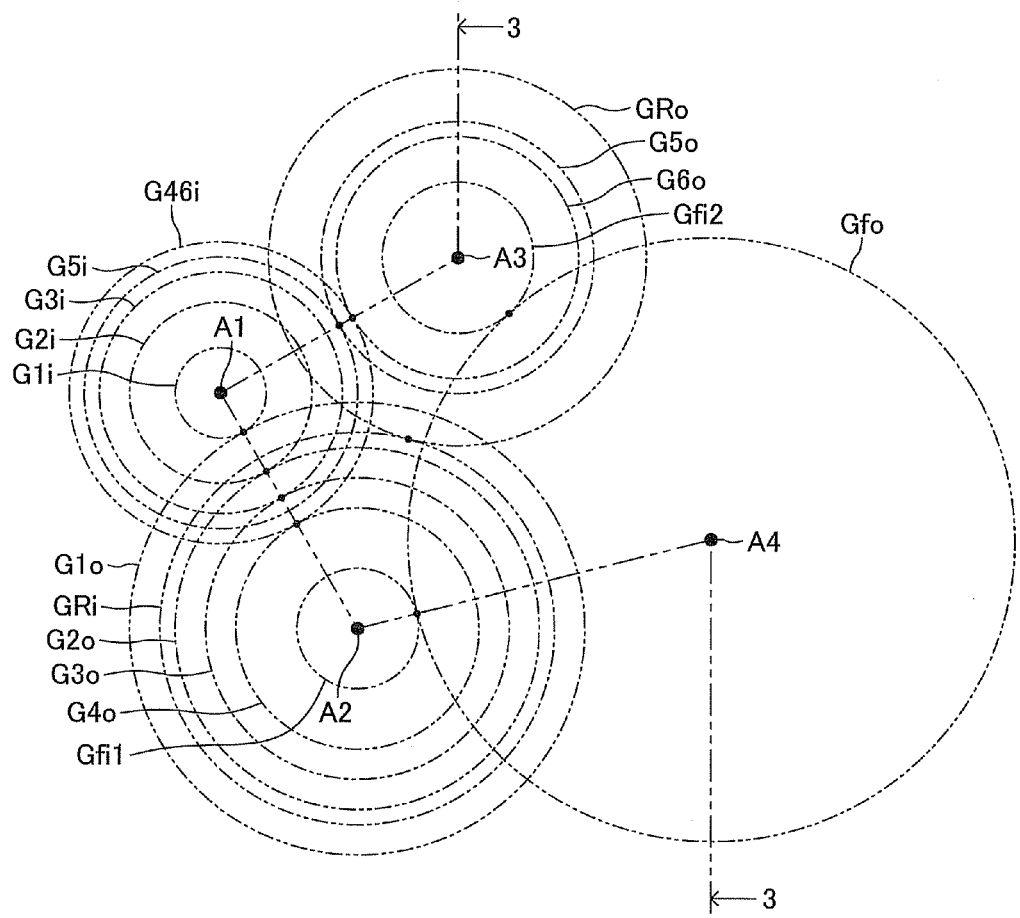
FIG. 2 is a schematic diagram illustrating an arrangement and meshed states of plural gears in the manual transmission illustrated in FIG. 1 as viewed in the axial direction.
Figure 2:
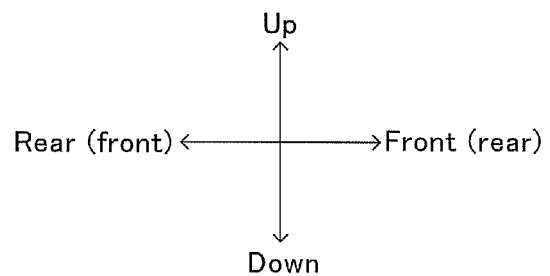

As illustrated in FIG. 1, the M/T according to the embodiment of the present invention includes an input shaft A1, a first intermediate shaft A2, a second intermediate shaft A3, and an output shaft A4, those of which are parallel to one another. In a state in which the M/T is mounted to the vehicle, the second intermediate shaft A3 is located above the first intermediate shaft A2. In the M/T, the shafts of the M/T are arranged at the side of an engine E/G through a clutch C/T in such a manner that they are arranged sideways with respect to the vehicle. The configuration of the M/T will be described below with reference to FIGS. 2 and 3.

(Configuration)

Figure 3:
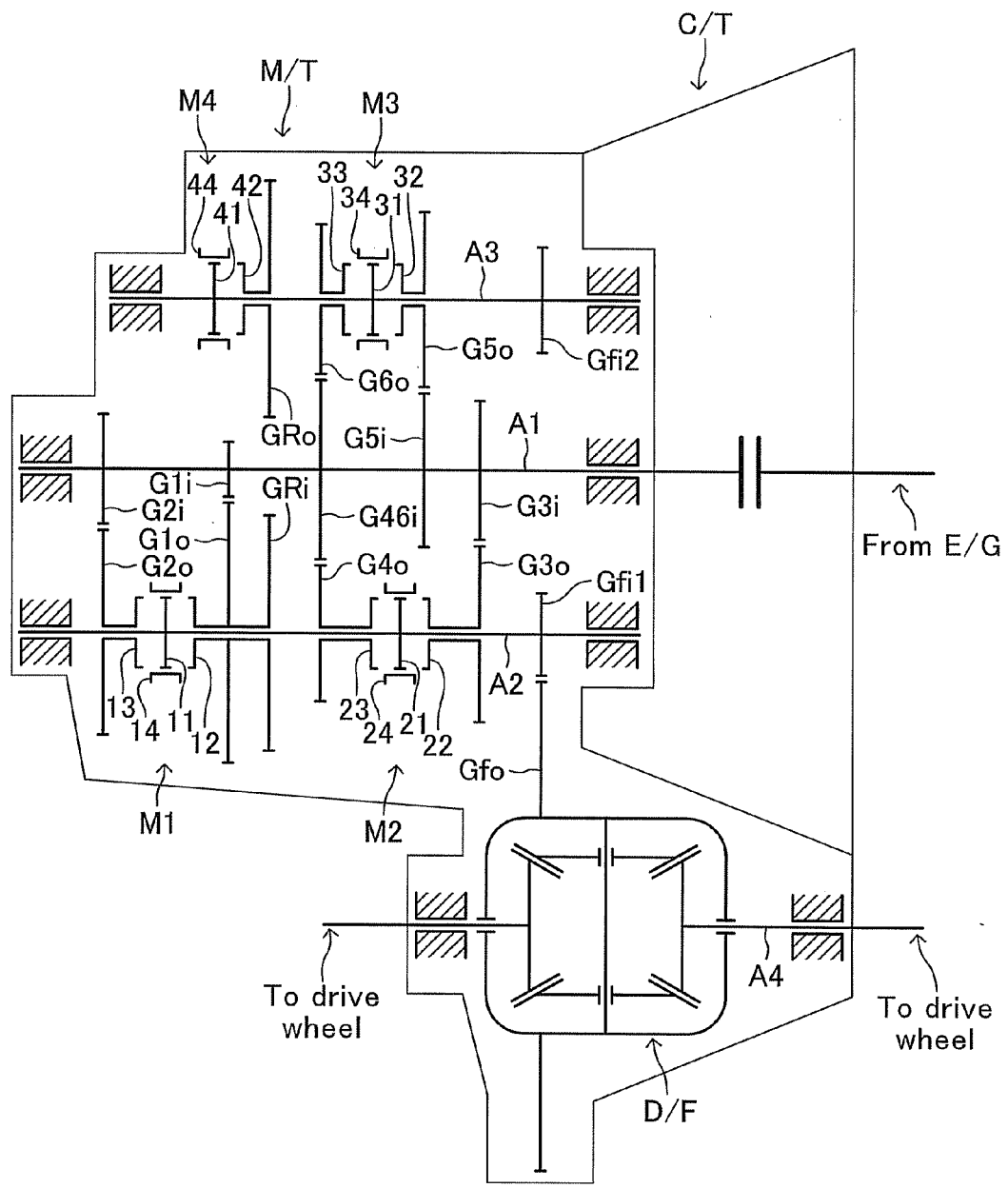
FIG. 3 is a skeleton view in a neutral state corresponding to the section obtained by cutting the manual transmission illustrated in FIG. 1 along a line 3-3 in FIG. 2.

As illustrated in FIG. 3, four shafts, which are the input shaft A1, the first intermediate shaft A2, the second intermediate shaft A3, and the output shaft A4, are supported by plural bearings (or bushes), which are fixed to a housing, so as to be rotatable in such a manner that they are eccentric and parallel to one another. The input shaft A1 is connected to an output shaft of the engine E/G through the clutch C/T. The output shaft A4 is connected to a drive wheel (2 front wheels) through an unillustrated connection mechanism.

A third-speed drive gear G3i, a fifth-speed drive gear G5i, a drive gear G46i, which is used as both a fourth-speed drive gear and a sixth-speed drive gear, a first-speed drive gear G1i, and a second-speed drive gear G2i are coaxially fixed to the input shaft A1 in this order from the side close to the engine E/G (clutch C/T) in such a manner that they cannot make relative rotation.

A third-speed driven gear G3o, a fourth-speed driven gear G4o, a first-speed driven gear G1o, and a second-speed driven gear G2o are coaxially arranged at the first intermediate shaft A2, in this order from the side close to the engine E/G, in such a manner that they can make relative rotation. The driven gears G3o, G4o, G1o, and G2o are always meshed with the drive gears G3i, G46i, G1i, and G2i.

A first final drive gear Gfi1 is coaxially fixed to the first intermediate shaft A2 at the side closer to the engine E/G than the third-speed driven gear G3o in such a manner that it cannot make a relative rotation. Further, a reverse driven gear GRi, which is coaxially rotated integral with the driven gear G1o, is arranged between the first-speed driven gear G1o and the fourth-speed driven gear G4o.

A fifth-speed driven gear G5o, a sixth-speed driven gear G6o, and a reverse driven gear GRo are coaxially arranged at the second intermediate shaft A3, in this order from the side close to the engine E/G, in such a manner that they can make relative rotation. The driven gears G5o, G6o, and GRo are always meshed with the drive gears G5i, G46i, and GRi (see FIG. 2 for the engagement between the GRi and the GRo). A second final drive gear Gfi2 is coaxially fixed to the second intermediate shaft A3 at the side closer to the engine E/G than the fifth-speed driven gear G5o in such a manner that it cannot make a relative rotation. The number of gear teeth of the second final drive gear Gfi2 is greater than the number of the gear teeth of the first final drive gear Gfi1.

A final driven gear Gfo, which is formed integral with a housing (casing) of a differential gear unit D/F having one of known structures, is coaxially arranged to the output shaft A4. The final driven gear Gfo is always meshed with the first and second final drive gears Gfi1 and Gfi2 (see FIG. 2 for the engagement between the Gfi1 and the Gfo, and the engagement between the Gfi2 and Gfo).

As illustrated in FIG. 3, the M/T includes first to fourth switching mechanisms M1 to M4. The changeover of the shift stages of the M/T is attained through the operation of the first to fourth switching mechanisms M1 to M4. The first to fourth switching mechanisms M1 to M4 are operated according to an operation of a shift lever through unillustrated plural link mechanisms that link the unillustrated shift lever and the first to fourth switching mechanisms M1 to M4.

The first switching mechanism M1 is arranged between the first-speed driven gear G1o and the second-speed driven gear G2o. The first switching mechanism M1 includes a coupling piece 11 that integrally rotates coaxial with the first intermediate shaft A2, a coupling piece 12 that integrally rotates coaxial with the driven gear G1o, a coupling piece 13 that integrally rotates coaxial with the driven gear G2o, and a sleeve 14 that is arranged so as to be capable of coaxially moving in the axial direction of the first intermediate shaft A2. The sleeve 14 is operated according to the operation of the shift lever through the above-mentioned link mechanisms.

The sleeve 14 can be spline-fitted to the coupling pieces 11, 12, and 13. When the sleeve 14 is in a non-connected state (at the position illustrated in FIG. 3) in which the sleeve 14 is spline-fitted only to the coupling piece 11, the driven gears G1o and G2o can rotate relative to the first intermediate shaft A2. When the sleeve 14 is in a first-speed state (at the position where the sleeve 14 moves to the right from the position illustrated in FIG. 3) in which the sleeve is spline-fitted to the coupling pieces 11 and 12, the driven gear G2o can rotate relative to the first intermediate shaft A2, but the driven gear G1o cannot rotate relative to the first intermediate shaft A2. When the sleeve 14 is in a second-speed state (at the position where the sleeve 14 moves to the left from the position illustrated in FIG. 3) in which the sleeve is spline-fitted to the coupling pieces 11 and 13, the driven gear G1o can rotate relative to the first intermediate shaft A2, but the driven gear G2o cannot rotate relative to the first intermediate shaft A2. As described above, in the first switching mechanism M1, one of the non-connected state, the first-speed state, and the second-state speed is selectively employed according to the position of the sleeve 14 operated through the operation of the shift lever.

Since the second and third switching mechanisms M2 and M3 have the structure similar to that of the first switching mechanism M1, the detailed description for these switching mechanisms M2 and M3 will not be repeated. The second switching mechanism M2 is arranged between the third-speed driven gear G3o and the fourth-speed driven gear G4o. The second switching mechanism M2 includes coupling pieces 21, 22, and 23 and a sleeve 24, each of which corresponds to the coupling pieces 11, 12, and 13 and the sleeve 14. In the second switching mechanism M2, one of the non-connected state, a third-speed state, and a fourth-speed state is selectively employed according to the position of the sleeve 24 operated through the operation of the shift lever.

The third switching mechanism M3 is arranged between the fifth-speed driven gear G5o and the sixth-speed driven gear G6o. The third switching mechanism M3 includes coupling pieces 31, 32, and 33 and a sleeve 34, each of which corresponds to the coupling pieces 11, 12, and 13 and the sleeve 14. In the third switching mechanism M3, one of the non-connected state, a fifth-speed state, and a sixth-speed state is selectively employed according to the position of the sleeve 34 operated through the operation of the shift lever.

The fourth switching mechanism M4 is arranged at the side remoter from the engine E/G than the sixth-speed driven gear G6o. The fourth switching mechanism M4 includes coupling pieces 41 and 42 and a sleeve 44, each of which corresponds to the coupling pieces 11 and 12 and the sleeve 14. In the fourth switching mechanism M4, one of the non-connected state, and a reverse state is selectively employed according to the position of the sleeve 44 operated through the operation of the shift lever.

(Operation)

The operation of the M/T thus configured will be described. Each of the shift stages of the M/T will be described below one by one.

<First Speed>

Figure 4:
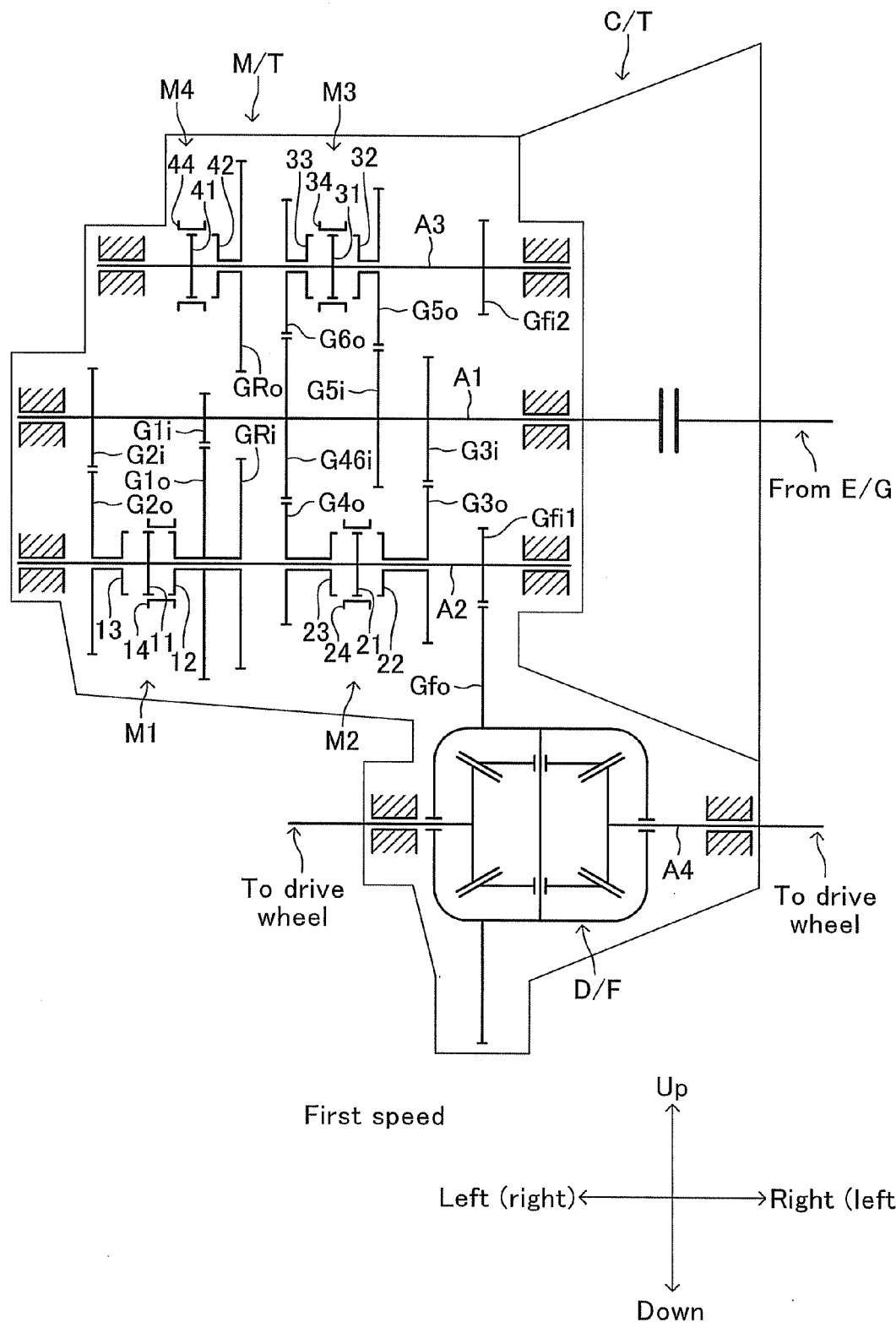
FIG. 4 is a skeleton view corresponding to FIG. 3 in a first-speed state.
Figure 5:
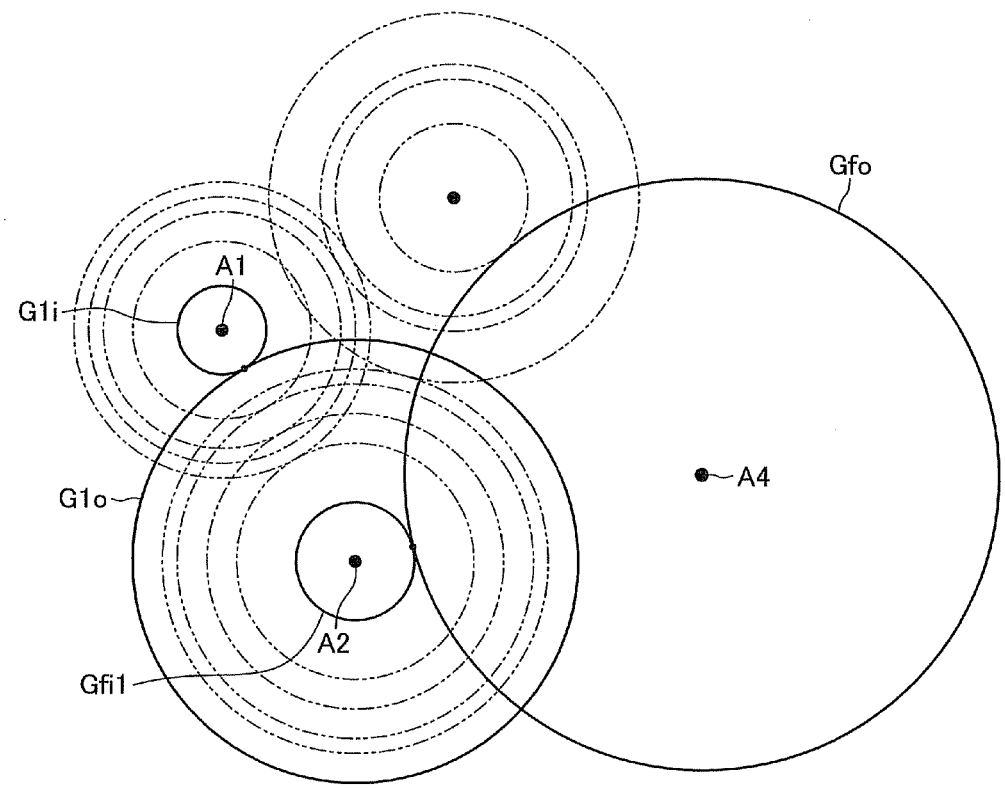
FIG. 5 is a schematic view corresponding to FIG. 2 in the first-speed state.
Figure 5:
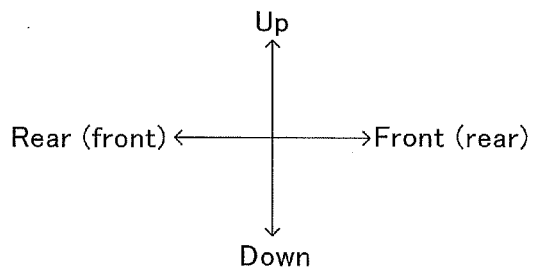

When the shift lever is operated to the position corresponding to the first speed, only the sleeve 14 is operated into the first-speed state, and the other sleeves 24, 34, and 44 are operated into the non-connected state, as illustrated in FIG. 4. Thus, the power transmission system of (A1→G1i→G1o→12→14→11→A2→Gfi1→Gfo→A4) is formed in the M/T as indicated by a gear train shown by a solid line in FIG. 5. As a result, when a vehicle travels forward, the speed reducing ratio of the M/T (=the ratio of the rotation speed of the input shaft A1 to the rotation speed of the output shaft A4) is set to be a speed reducing ratio GT1 for the first speed. The GT1 is represented by ((number of gear teeth of G1o)/(number of gear teeth of G1i))·GTf1. Here, the GTf1 is represented by ((number of gear teeth of Gf0)/(number of gear teeth of Gfi1)). The GTf1 is referred to as "first final speed reducing ratio" below.

<Second Speed>

Figure 6:
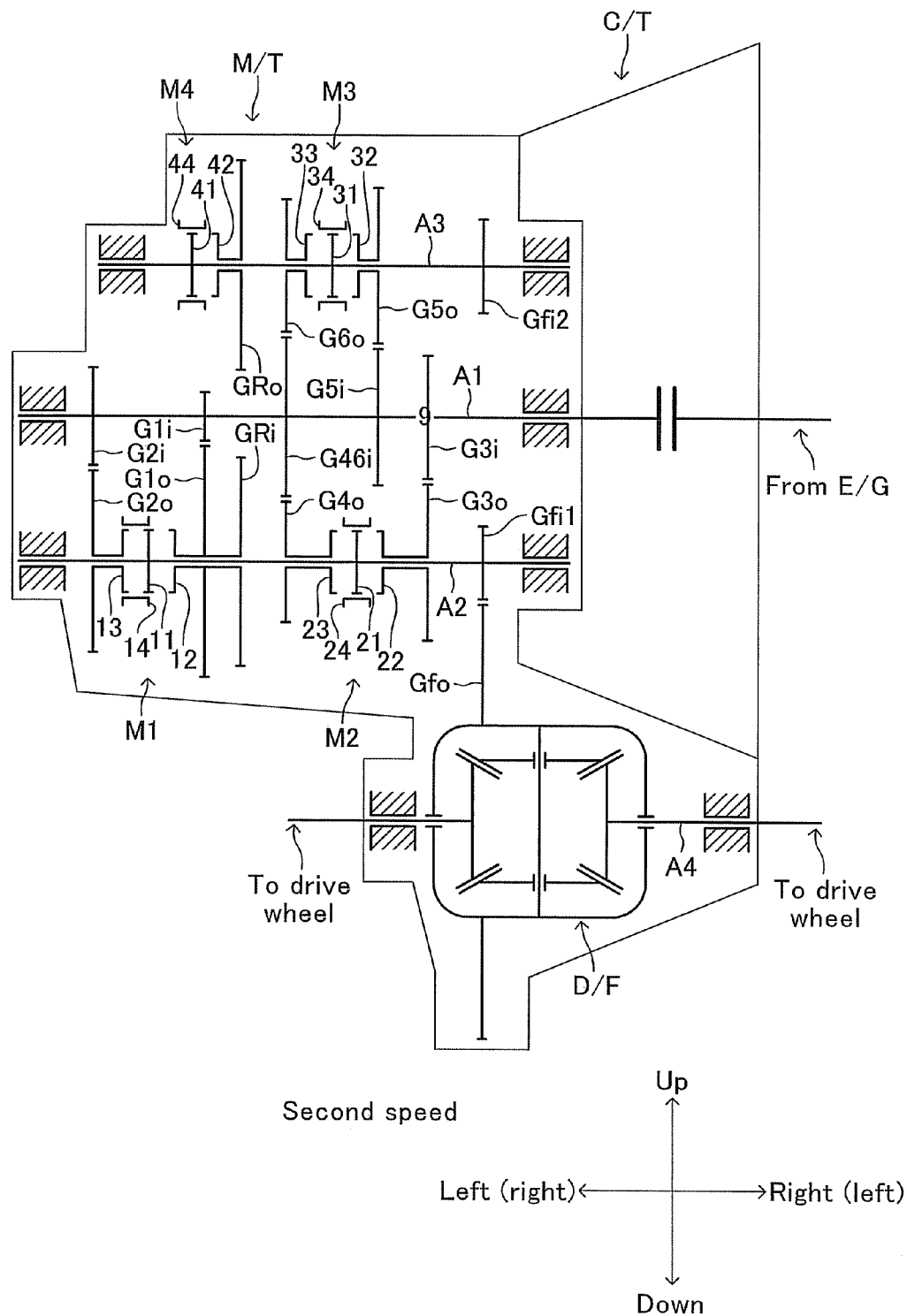
FIG. 6 is a skeleton view corresponding to FIG. 3 in a second-speed state.
Figure 7:
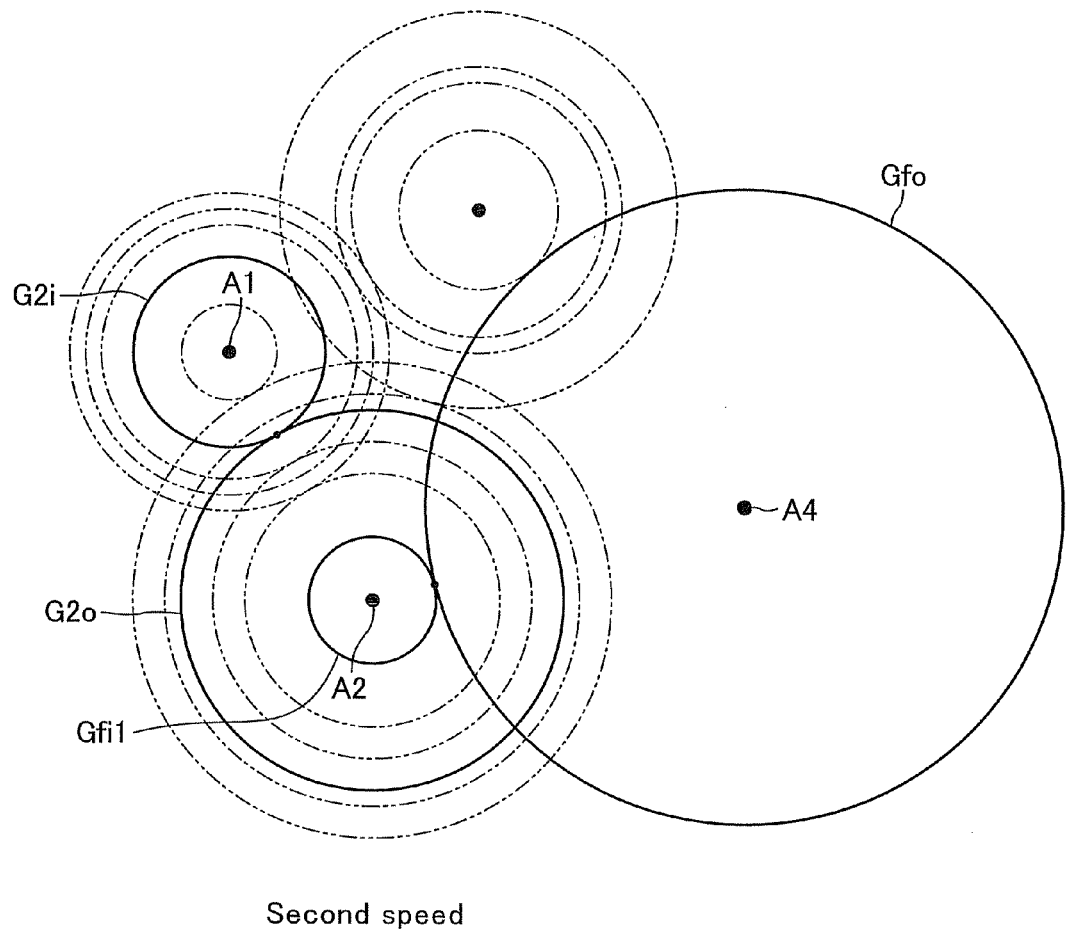
FIG. 7 is a schematic view corresponding to FIG. 2 in the second-speed state.
Figure 7:
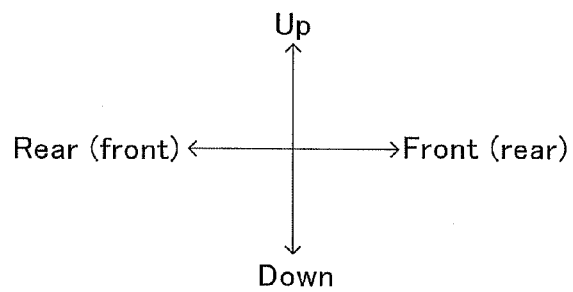

When the shift lever is operated to the position corresponding to the second speed, only the sleeve 14 is operated into the second-speed state, and the other sleeves 24, 34, and 44 are operated into the non-connected state, as illustrated in FIG. 6. Thus, the power transmission system of (A1→G2$i$→G2$o$→13→14→11→A2→Gfi1→Gfo→A4) is formed in the M/T as indicated by a gear train shown by a solid line in FIG. 7. As a result, when the vehicle travels forward, the speed reducing ratio of the M/T is set to be a speed reducing ratio GT2 for the second speed. The GT2 is represented by ((number of gear teeth of G2$o$)/(number of gear teeth of G2$i$))·GTf1. The relationship of GT1>GT2 is established.

<Third Speed>

Figure 8:
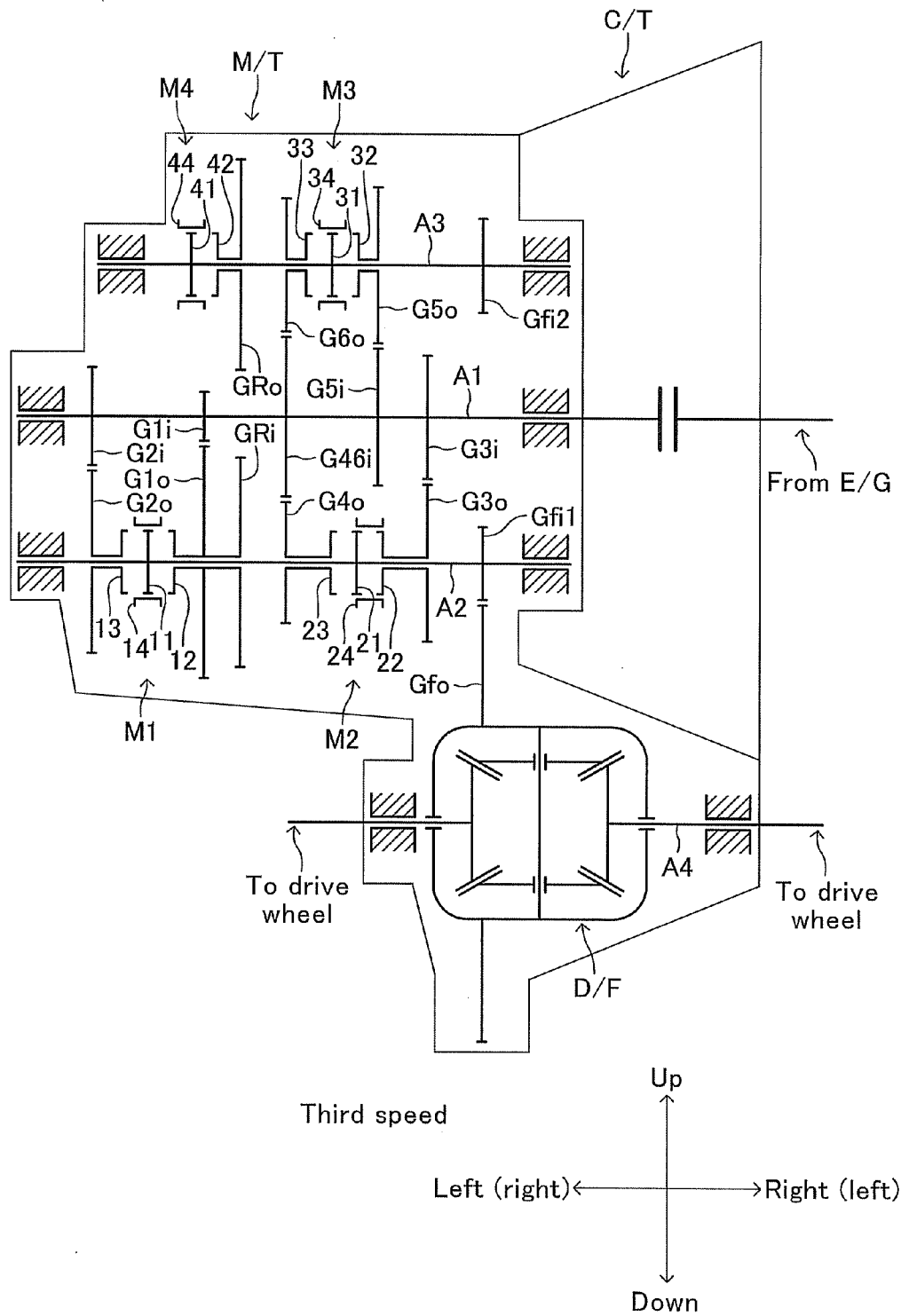
FIG. 8 is a skeleton view corresponding to FIG. 3 in a third-speed state.
Figure 9:
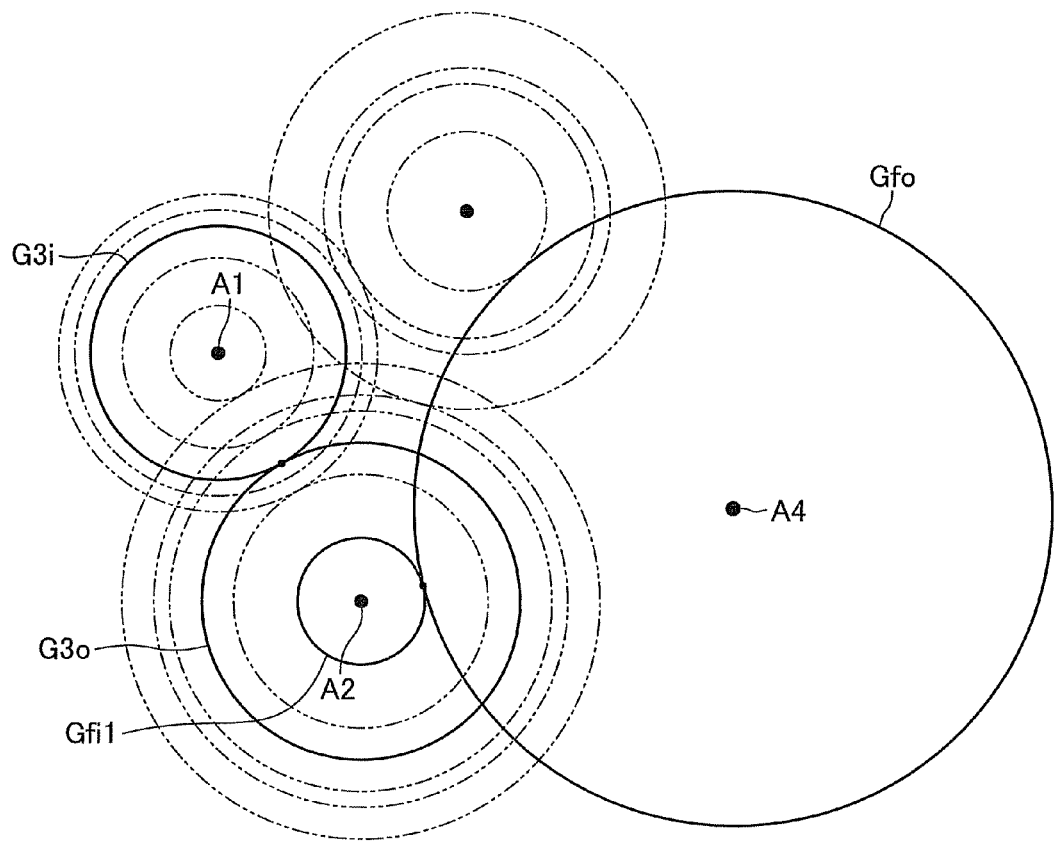
FIG. 9 is a schematic view corresponding to FIG. 2 in the third-speed state.
Figure 9:
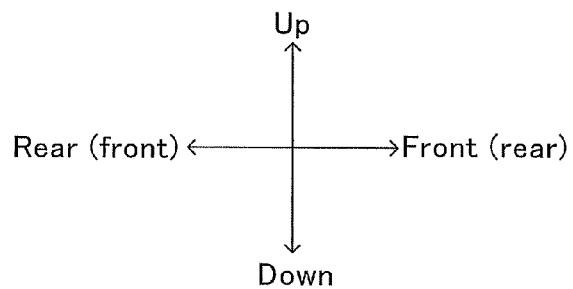

When the shift lever is operated to the position corresponding to the third speed, only the sleeve 24 is operated into the third-speed state, and the other sleeves 14, 34, and 44 are operated into the non-connected state, as illustrated in FIG. 8. Thus, the power transmission system of (A1→G3$i$→G3$o$→22→24→21→A2→Gfi1→Gfo→A4) is formed in the M/T as indicated by a gear train shown by a solid line in FIG. 9. As a result, when the vehicle travels forward, the speed reducing ratio of the M/T is set to be a speed reducing ratio GT3 for the third speed. The GT3 is represented by ((number of gear teeth of G3$o$)/(number of gear teeth of G3$i$))·GTf1. The relationship of GT2>GT3 is established.

<Fourth Speed>

Figure 10:
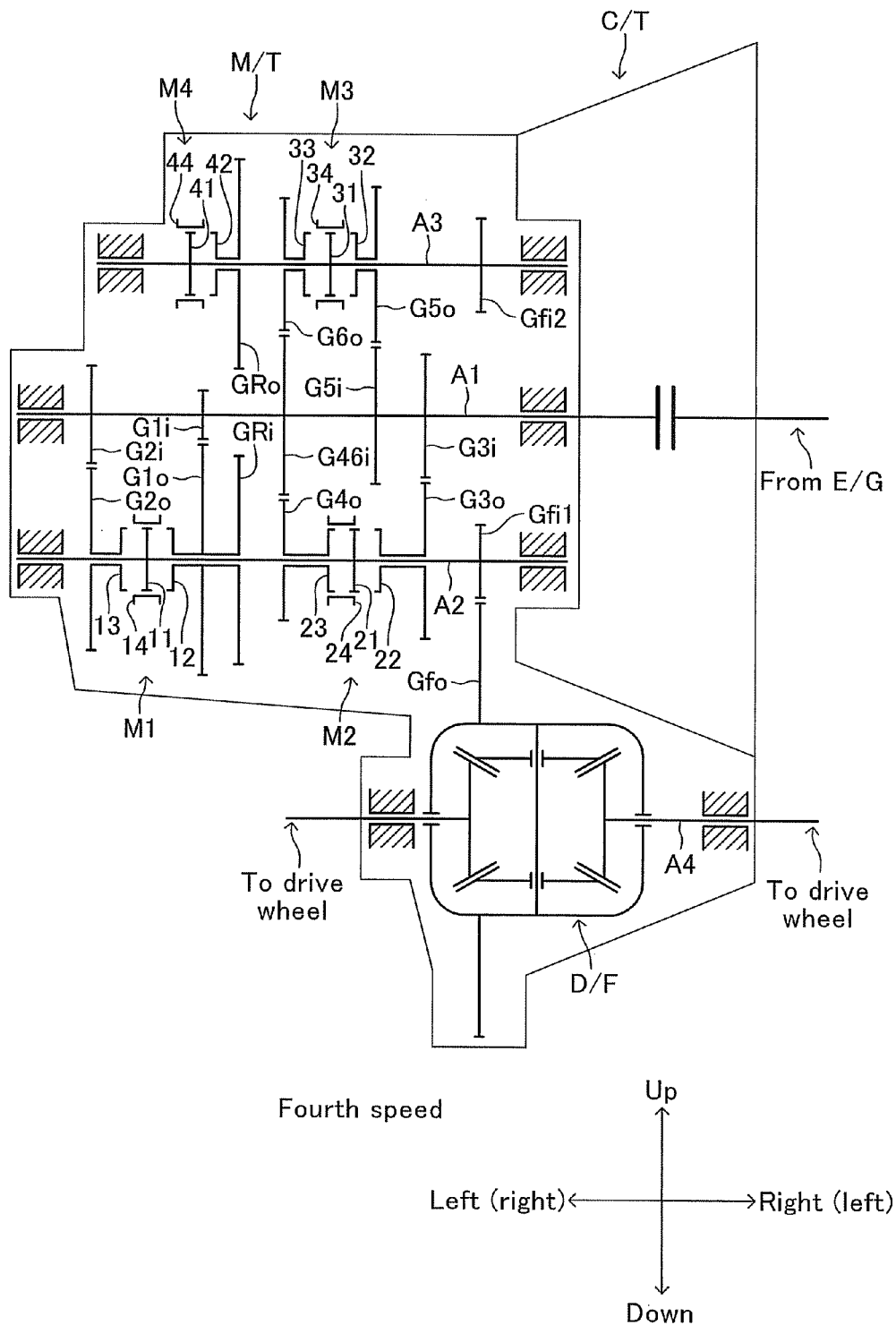
FIG. 10 is a skeleton view corresponding to FIG. 3 in a fourth-speed state.
Figure 11:
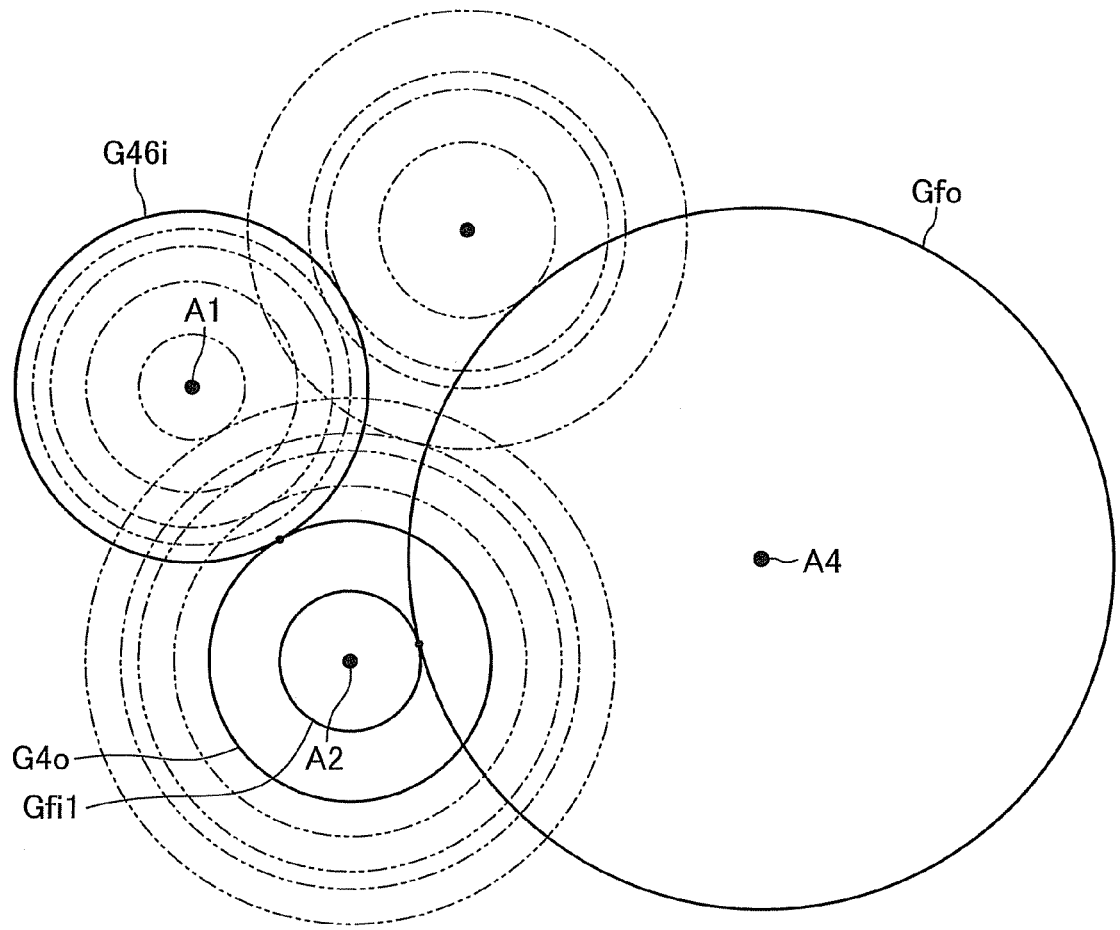
FIG. 11 is a schematic view corresponding to FIG. 2 in the fourth-speed state.
Figure 11:
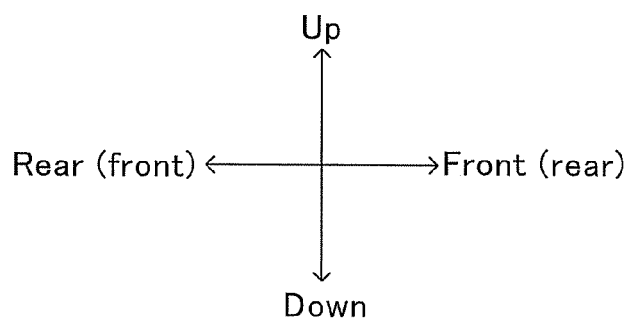

When the shift lever is operated to the position corresponding to the fourth speed, only the sleeve 24 is operated into the fourth-speed state, and the other sleeves 14, 34, and 44 are operated into the non-connected state, as illustrated in FIG. 10. Thus, the power transmission system of (A1→G46$i$→G4$o$→23→24→21→A2→Gfi1→Gfo→A4) is formed in the M/T as indicated by a gear train shown by a solid line in FIG. 11. As a result, when the vehicle travels forward, the speed reducing ratio of the M/T is set to be a speed reducing ratio GT4 for the fourth speed. The GT4 is represented by ((number of gear teeth of G4$o$)/(number of gear teeth of G46$i$))·GTf1. The relationship of GT3>GT4 is established.

<Fifth Speed>

Figure 12:
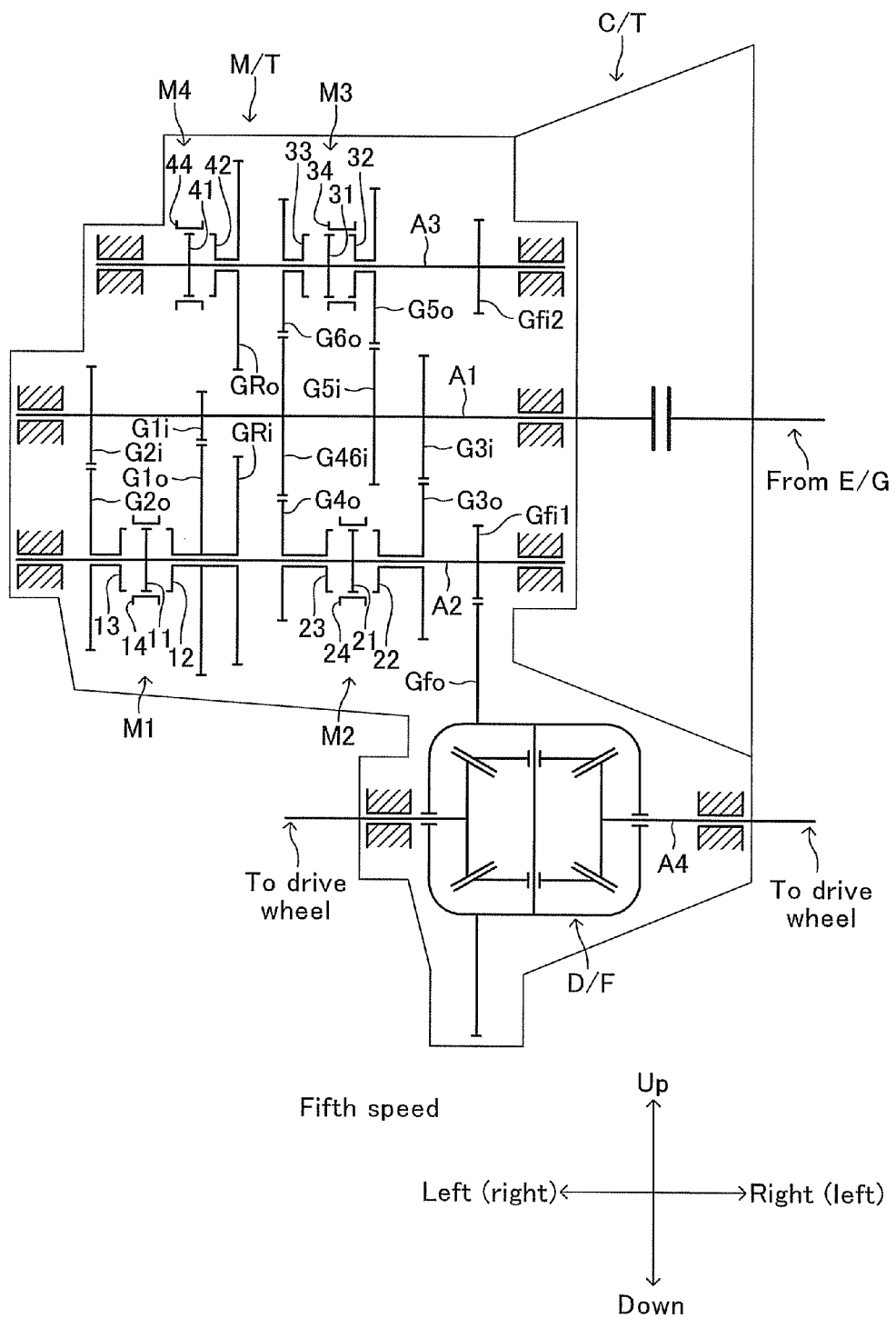
FIG. 12 is a skeleton view corresponding to FIG. 3 in a fifth-speed state.
Figure 13:
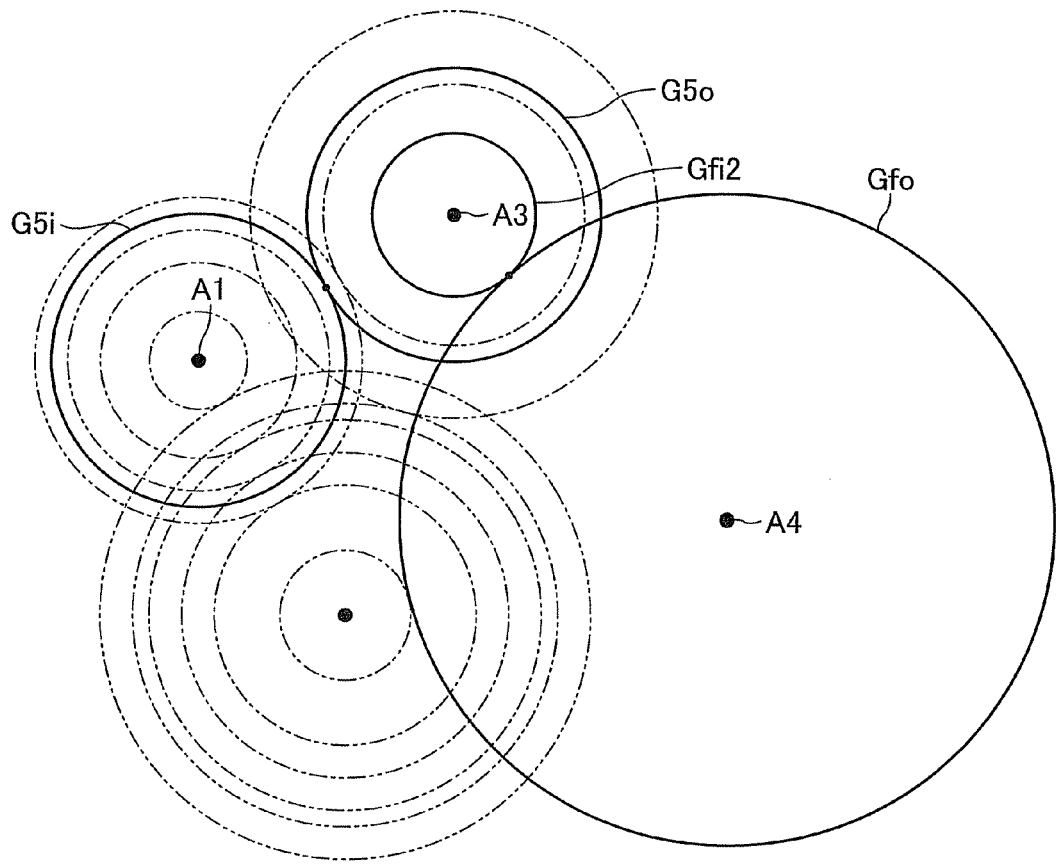
FIG. 13 is a schematic view corresponding to FIG. 2 in the fifth-speed state.
Figure 13:
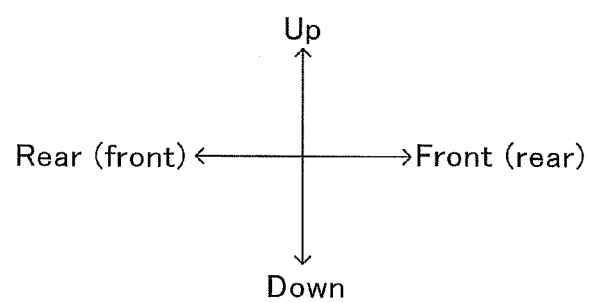

When the shift lever is operated to the position corresponding to the fifth speed, only the sleeve 34 is operated into the fifth-speed state, and the other sleeves 14, 24, and 44 are operated into the non-connected state, as illustrated in FIG. 12. Thus, the power transmission system of (A1→G5$i$→G5$o$→32→34→31→A3→Gfi2→Gfo→A4) is formed in the M/T as indicated by a gear train shown by a solid line in FIG. 13. As a result, when the vehicle travels forward, the speed reducing ratio of the M/T is set to be a speed reducing ratio GT5 for the fifth speed. The GT5 is represented by ((number of gear teeth of G5$o$)/(number of gear teeth of G5$i$))·GTf2. Here, the GTf2 is represented by ((number of gear teeth of Gfo)/(number of gear teeth of Gfi2)). The GTf2 is referred to as "second final speed reducing ratio" below. The relationship of GT4>GT5 is established.

<Sixth Speed>

Figure 14:
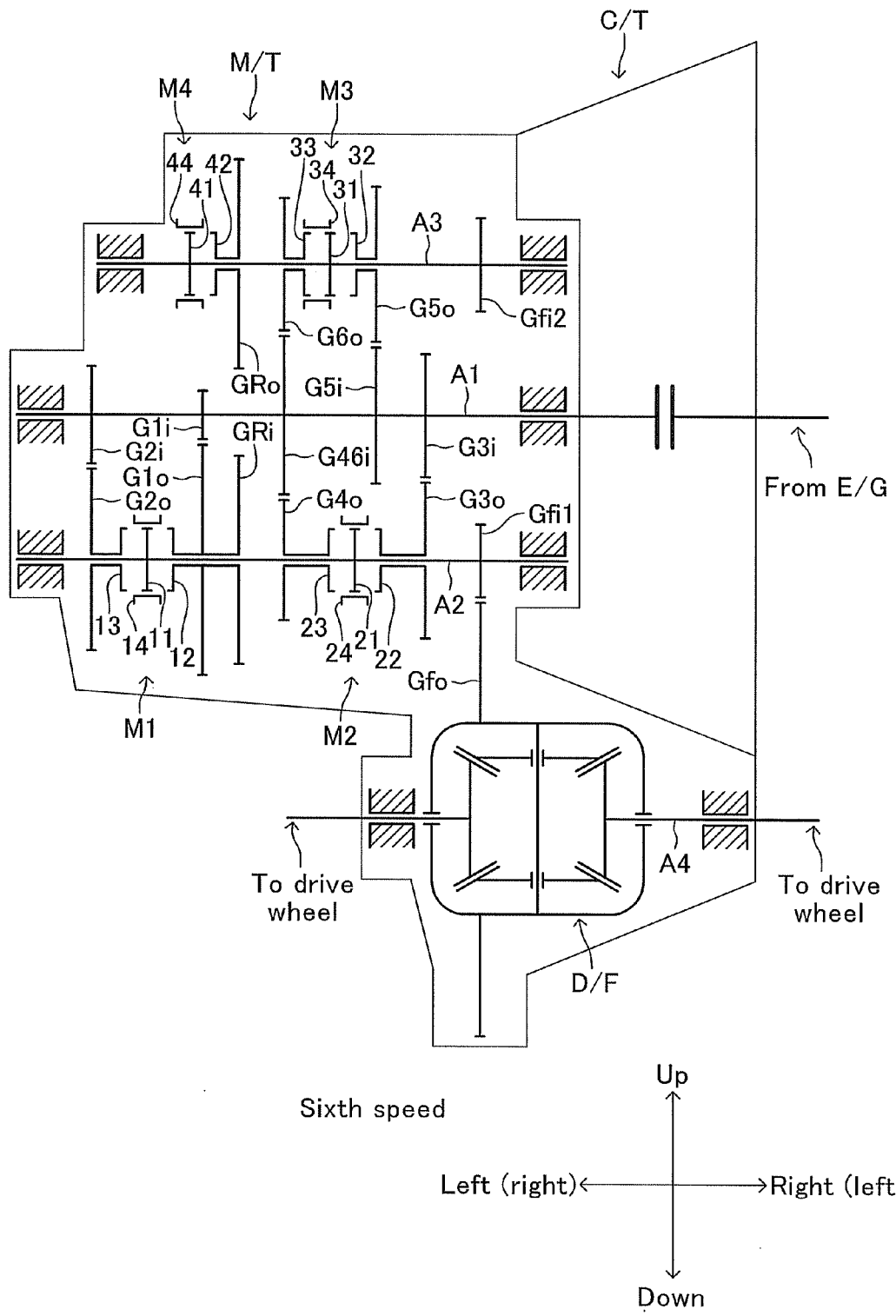
FIG. 14 is a skeleton view corresponding to FIG. 3 in a sixth-speed state.
Figure 15:
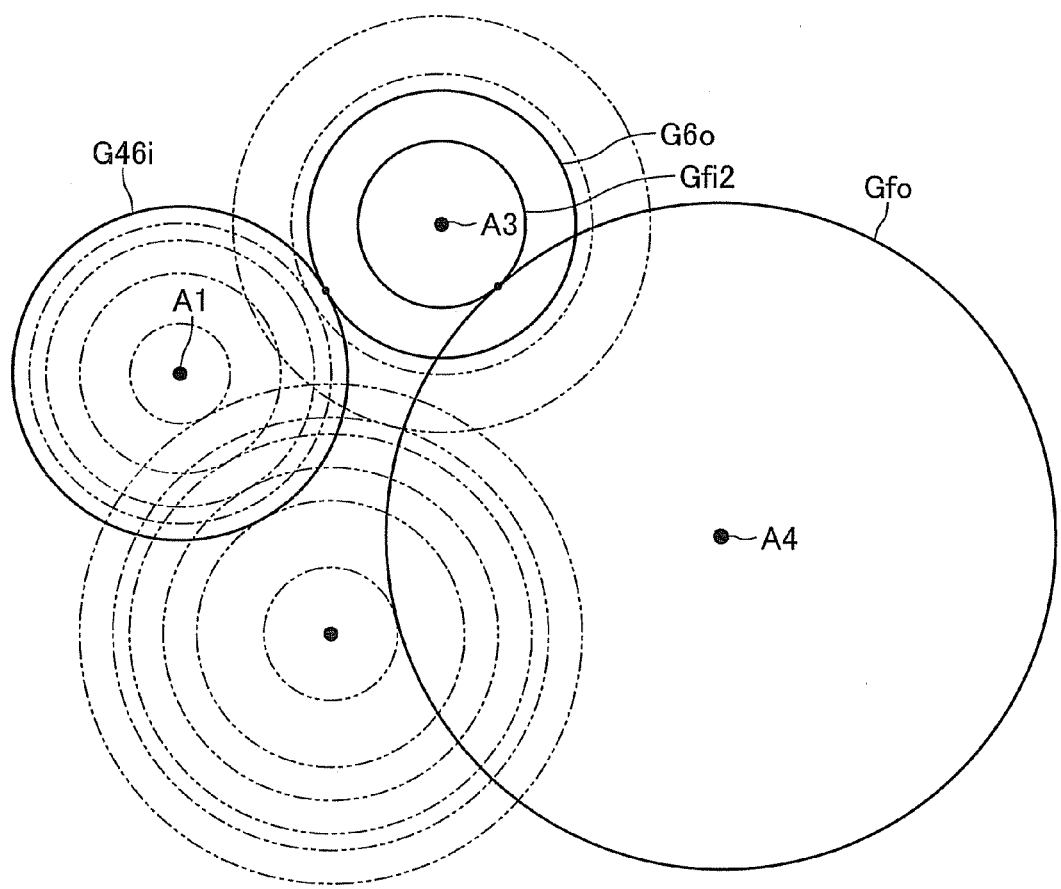
FIG. 15 is a schematic view corresponding to FIG. 2 in the sixth-speed state.
Figure 15:
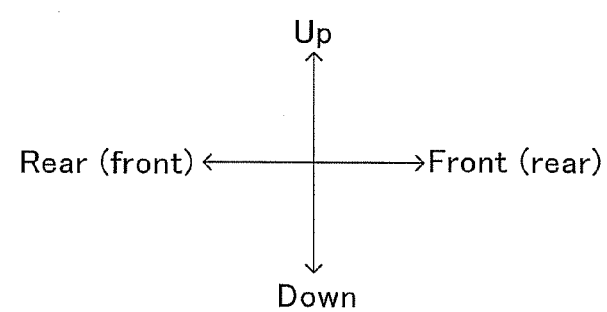

When the shift lever is operated to the position corresponding to the sixth speed, only the sleeve 34 is operated into the fourth-speed state, and the other sleeves 14, 24, and 44 are operated into the non-connected state, as illustrated in FIG. 14. Thus, the power transmission system of (A1→G46$i$→G6$o$→33→34→31→A3→Gfi2→Gfo→A4) is formed in the M/T as indicated by a gear train shown by a solid line in FIG. 15. As a result, when the vehicle travels forward, the speed reducing ratio of the M/T is set to be a speed reducing ratio GT6 for the sixth speed. The GT6 is represented by ((number of gear teeth of G6$o$)/(number of gear teeth of G46$i$))·GTf2. The relationship of GT5>GT6 is established.

<Reverse>

Figure 16:
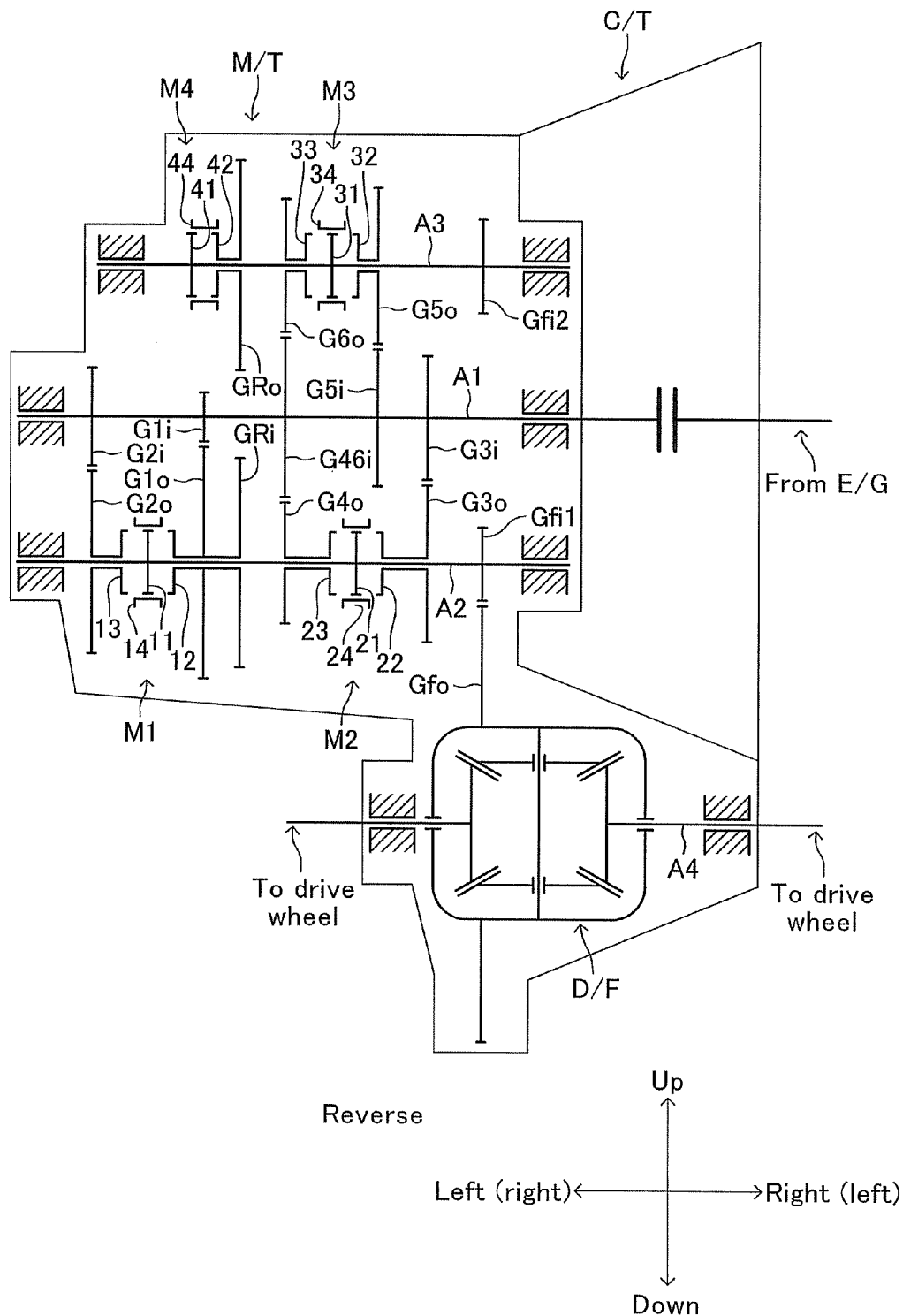
FIG. 16 is a skeleton view corresponding to FIG. 3 in a reverse state.
Figure 17:
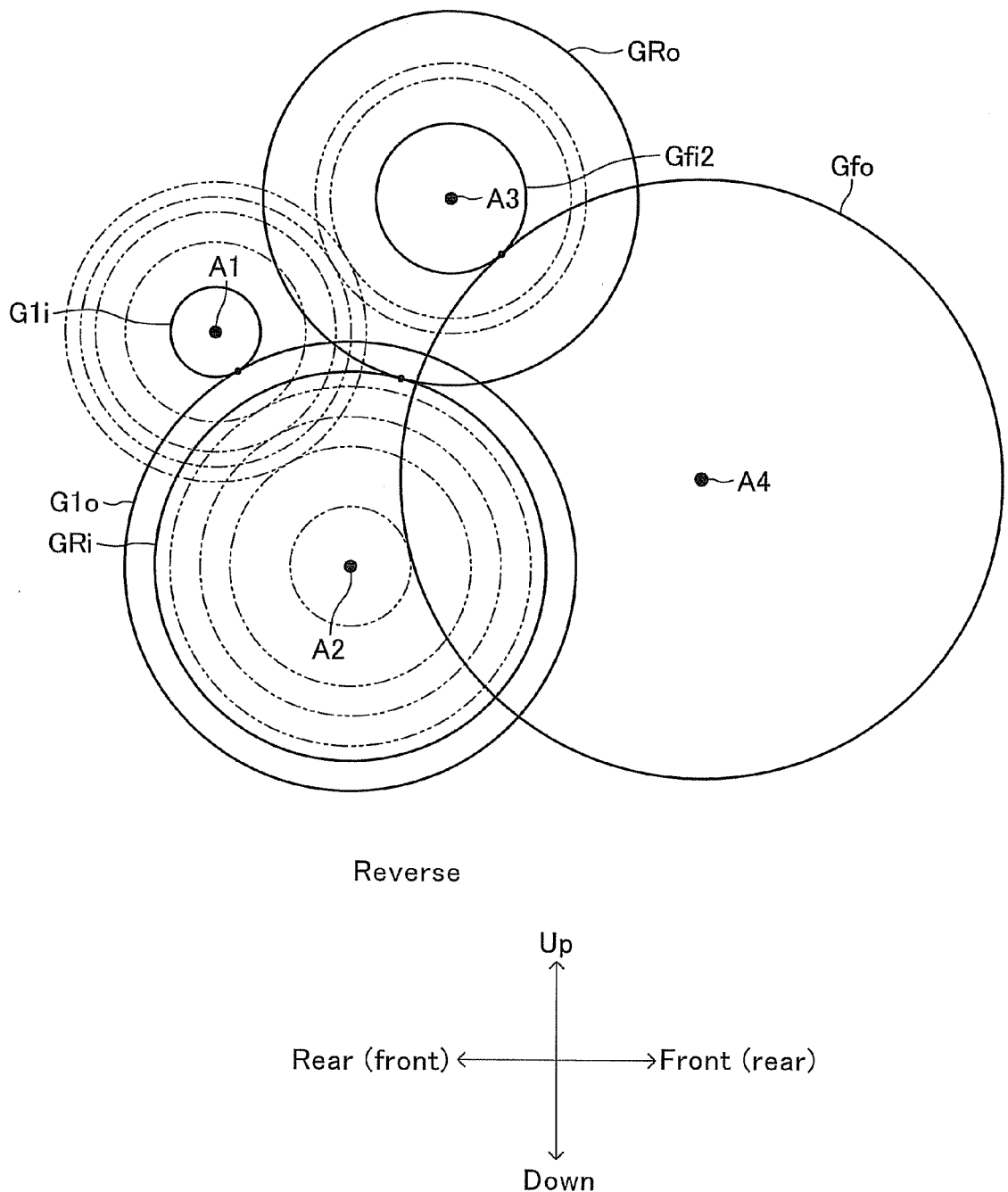
FIG. 17 is a schematic view corresponding to FIG. 2 in the reverse state.

When the shift lever is operated to the position corresponding to the reverse, only the sleeve 44 is operated into the reverse state, and the other sleeves 14, 24, and 34 are operated into the non-connected state, as illustrated in FIG. 16. Thus, the power transmission system of (A1→G1$i$→G1$o$→GRi→GRo→42→44→41→A3→Gfi2→Gfo→A4) is formed in the M/T as indicated by a gear train shown by a solid line in FIG. 17. As a result, the second intermediate shaft A3 inversely rotates, whereby the vehicle is backed, compared to the cases of the first-speed to the sixth-speed. When the vehicle is backed, the speed reducing ratio of the M/T is set to be a speed reducing ratio GTR for the reverse speed. The GTR is represented by ((number of gear teeth of G1$o$)/(number of gear teeth of G1$i$))·((number of gear teeth of GRo)/(number of gear teeth of GRi)·GTf2.

(Operation and Effect)

The operation and effect of the M/T according to the embodiment of the present invention thus configured will next be described.

Firstly, in the M/T, the single drive gear G46$i$ is shared as the fourth-speed drive gear and the sixth-speed drive gear, which should be coaxially fixed to the input shaft A1. Thus, the operation and effect described below are obtained. Specifically, compared to the case in which the fourth-speed drive gear and the sixth-speed drive gear are independently arranged and fixed so as to be coaxial with the input shaft A1, the number of the drive gears that are coaxially fixed to the input shaft A1 is reduced by 1. Consequently, the length of the input shaft A1 can be reduced.

Further, the fourth-speed drive gear and the sixth-speed drive gear are selected as the combination of two drive gears, which are to be the subject shared by the single drive gear. This is based upon the reason described below. When a single drive gear is used for both two different shift stages P and Q, the degree of freedom in designing the magnitude of the speed reducing ratio of the shift stage P and the speed reducing ratio of the shift stage Q is generally reduced, compared to the case in which the drive gears for the shift stages P and Q are independently arranged. In other words, the degree of freedom in designing "the ratio of the speed reducing ratio of the shift stage Q to the speed reducing ratio of the shift stage P" is reduced. This means that the range of a vehicle type (displacement, vehicle class, maximum torque of engine) to which the M/T can be mounted might be narrowed.

On the other hand, the present inventor has calculated the "ratio of the speed reducing ratio of the shift stage Q to the speed reducing ratio of the shift stage P" for all combinations of two shift stages P and Q among the first speed to the sixth speed for each of the vehicles of various types (displacement, vehicle class, maximum torque of engine), which include the six speed M/T and has already been commercially available. As a result, the present inventor has found that the variation range in "the ratio of the speed reducing ratio of the sixth speed to the speed reducing ratio of the fourth speed" to the change in the vehicle type (displacement, vehicle class, maximum torque of engine) is relatively small, for the combination of the fourth speed and the sixth speed of the combinations of two shift stages among the first speed to the sixth speed. Therefore, the structure in which a single drive gear G46$i$ is used both as the fourth-speed drive gear and the sixth-speed drive gear can prevent as much as possible the situation in which the type (displacement, vehicle class, maximum torque of engine) of the vehicle to which the M/T can be mounted is narrowed.

Secondly, in the M/T, the number of gear teeth of the second final drive gear Gfi2 is greater than the number of gear teeth of the first final drive gear Gfi1 as described above. This brings the operation and effect described below. Specifically, the final speed reducing ratio between the first intermediate shaft A2 and the output shaft A4 (=the first final speed reducing ratio GTf1) is greater than the final speed reducing ratio between the second intermediate shaft A3 and the output shaft A4 (=the second final speed reducing ratio GTf2). Additionally, the first-speed driven gear G1$o$ (the shift stage of the lowest speed) is arranged at the first intermediate shaft A2, while the sixth-speed driven gear G6$o$ (the shift stage of the highest speed) is arranged to the second intermediate shaft A3 different from the first intermediate shaft A2. As a result, it is easy to design that the difference (ratio) between the speed reducing ratio of the first speed and the speed reducing ratio of the sixth speed increases. Specifically, making the speed reducing ratio of the M/T wide is easy to be attained.

Thirdly, in the M/T, the third-speed driven gear G3$o$, the fourth-speed driven gear G4$o$, the first-speed driven gear G1$o$, and the second-speed driven gear G2$o$ are arranged in the axial direction of the first intermediate shaft A2 in this order from the side close to the engine E/G in a state in which the M/T is mounted to the vehicle, while the fifth-speed driven gear G5$o$, the sixth-speed driven gear G6$o$, and the reverse driven gear GRo are arranged in the axial direction of the second intermediate shaft A3 in this order from the side close to the engine E/G in a state in which the M/T is mounted to the vehicle. This structure brings the operation and effect described below.

As described above, the first switching mechanism M1 for switching the first speed and the second speed is arranged between the first-speed driven gear G1$o$ and the second-speed driven gear G2$o$, the second switching mechanism M2 for switching the third speed and the fourth speed is arranged between the third-speed driven gear G3$o$ and the fourth-speed driven gear G4$o$, the third switching mechanism M3 for switching the fifth speed and the sixth speed is arranged between the fifth-speed driven gear G5$o$ and the sixth-speed driven gear G6$o$, and the fourth switching mechanism M4 for selecting the reverse is arranged adjacent to the reverse driven gear GRo at the side remote from the engine E/G (see FIG. 3).

Figure 18:
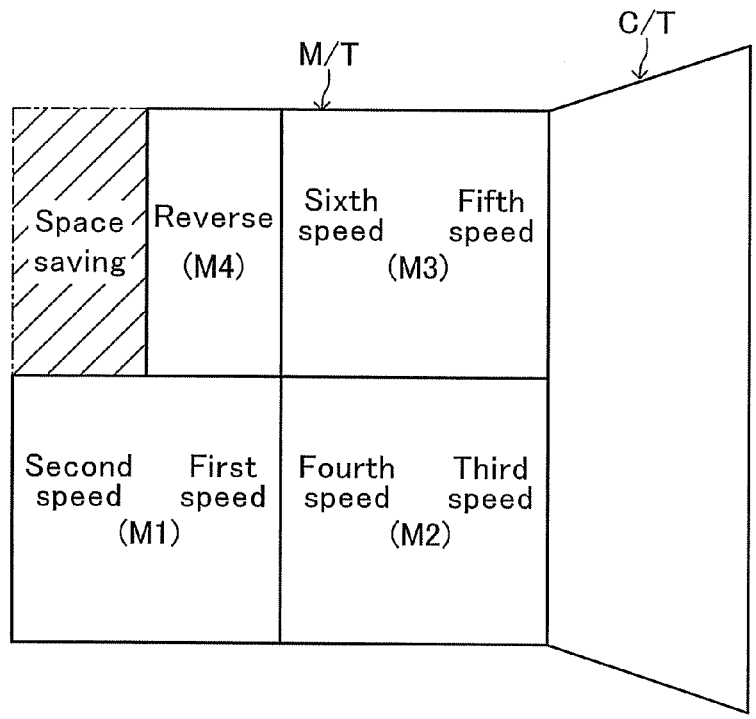
FIG. 18 is a schematic diagram illustrating the arrangement of gears corresponding to the respective shift stages in the manual transmission illustrated in FIG. 1.

Accordingly, as illustrated in FIG. 18, it can be considered that the M/T is composed such that four regions, which are the region relating to the first speed and the second speed, the region relating to the third speed and the fourth speed, the region relating to the fifth speed and the sixth speed, and the region relating to the reverse, are collected. As illustrated in FIG. 18, the region relating to the reverse is narrower than the other three regions in the axial direction. This is based upon the fact that the number of components of the fourth switching mechanism M4 is smaller than the number of the components of the other three switching mechanisms, and that the number of the driven gear included in each of the other three regions is two, while the number of the driven gear included in the region relating to the reverse is one.

Additionally, since the reverse drive gear GRi is arranged between the first-speed driven gear G1$o$ and the fourth-speed driven gear G4$o$, the region relating to the reverse is arranged at the side very close to the engine E/G. As a result, the length of the second intermediate shaft A3 (specifically, the upper intermediate shaft when the M/T is mounted to a vehicle) of the first and second intermediate shafts A2 and A3 can particularly be reduced, as illustrated in FIG. 3. Accordingly, the position in the lateral direction at the upper portion of the end of the housing of the M/T, which is opposite to the engine E/G, can be set to be closer to the engine E/G than the lower portion of the end.

In other words, as illustrated in FIG. 18, the space (see the hatched region in FIG. 18) adjacent to the region relating to the reverse at the far side of the engine E/G can effectively be utilized. As a result, as illustrated in FIG. 1, the interference between the upper portion of the end of the housing of the M/T at the side reverse to the engine E/G and the side frame is easy to be avoided, even under the circumstance in which the space between the right and left side frames is decreased in the engine room due to the large-sized and straightened vehicle side frame.

Figure 19:
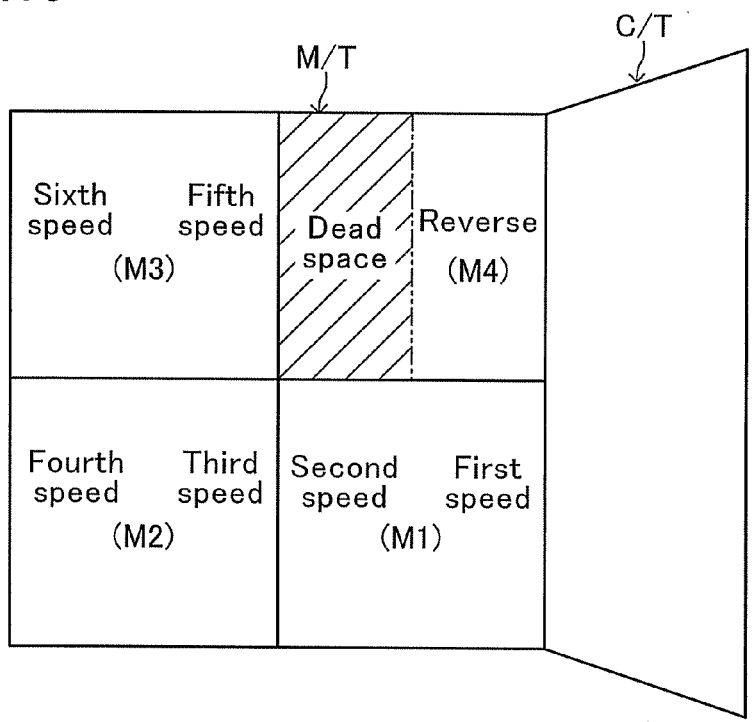
FIG. 19 is a schematic diagram illustrating the arrangement of gears corresponding to the respective shift stages in a manual transmission in a comparative example.

On the other hand, as illustrated in FIG. 19, when the region relating to the fifth speed and the sixth speed and the region relating to the reverse is inversely arranged, a dead space is inevitably formed between the region relating to the reverse and the region relating to the fifth speed and the sixth speed. As a result, the length of the second intermediate shaft A3 cannot be decreased than the length of the first intermediate shaft A2.

As can be understood from FIG. 3, the moving direction of the sleeve 14 in the first switching mechanism M1 during the shift from the first speed to the second speed, the moving direction of the sleeve 24 in the second switching mechanism M2 during the shift from the third speed to the fourth speed, and the moving direction of the sleeve 34 in the third switching mechanism M3 during the shift from the fifth speed to the sixth speed are the same, which is the direction from the side closer to the engine E/G toward the side apart from the engine E/G in the axial direction.

Figure 20:
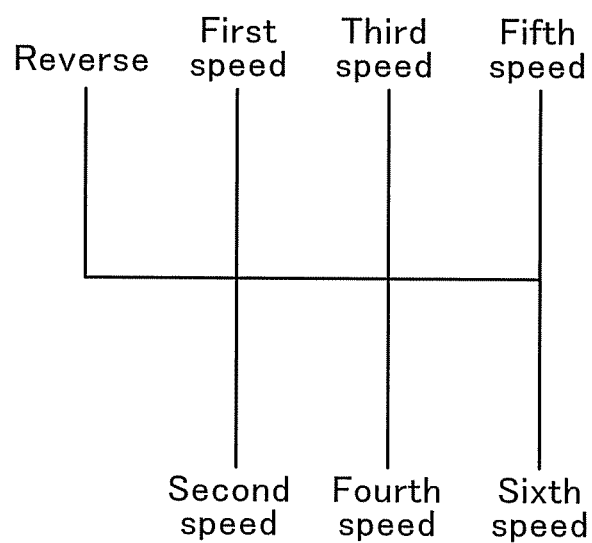
FIG. 20 is a view illustrating one example of a shift pattern of a shift lever used in the six speed M/T.
Figure 21:
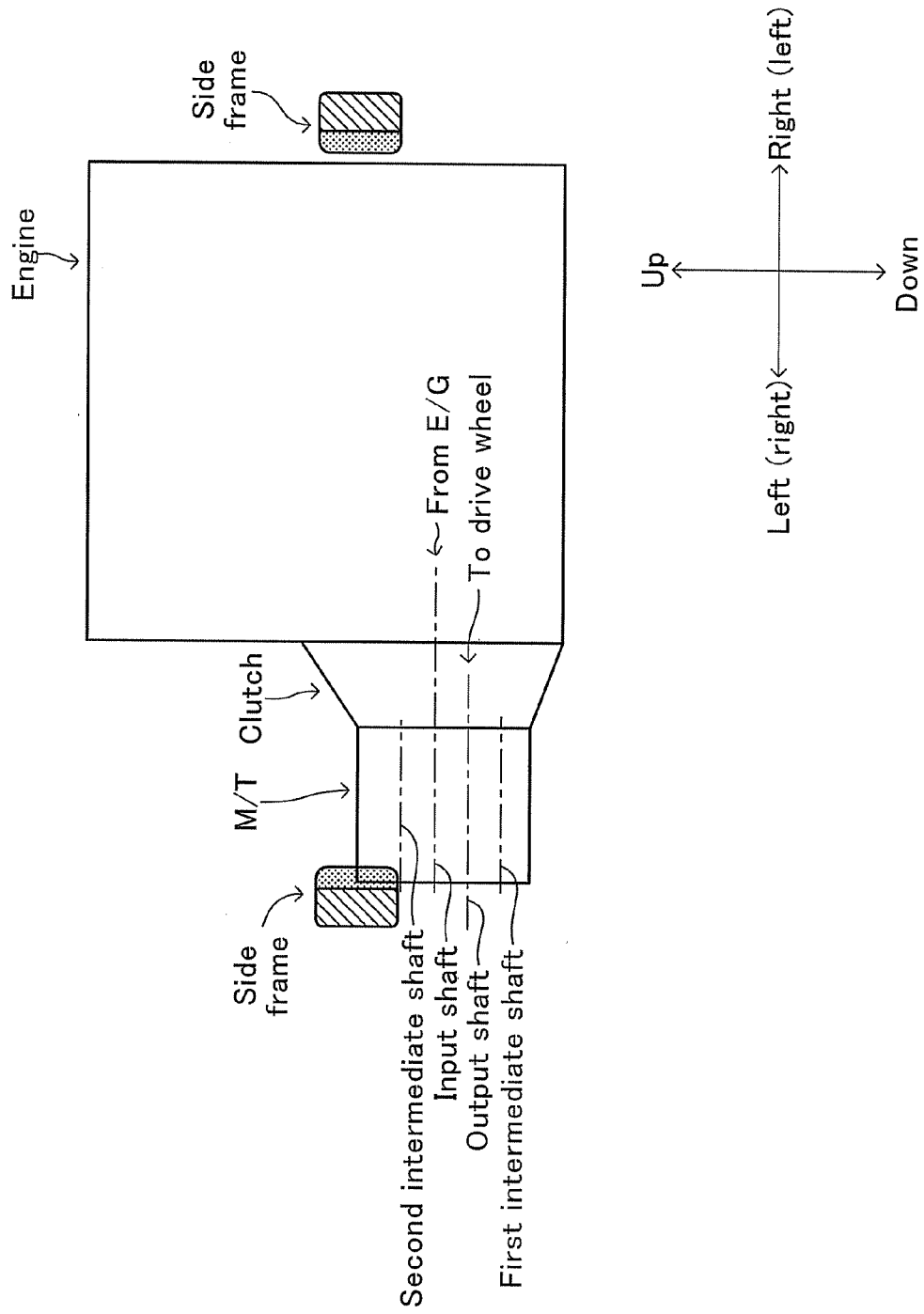
FIG. 21 is a schematic diagram illustrating a state in which an assembly including an engine, a clutch, and a manual transmission according to the comparative example is arranged sideways between right and left side frames in an engine room of a vehicle.

On the other hand, the pattern of the shift lever corresponding to the six speed M/T is as illustrated in FIG. 20. In this pattern, the moving direction of the shift lever during the shift from the first speed to the second speed, during the shift from the third speed to the fourth speed, and during the shift from the fifth speed to the sixth speed are the same. From the above, the moving direction of the shift lever and the moving direction of the corresponding sleeve agree with each other in the respective shifts that are the shift from the first speed to the second speed, the shift from the third speed to the fourth speed, and the shift from the fifth speed to the sixth speed. Accordingly, the number of links linking the shift lever and the respective switching mechanisms can be reduced, compared to the case in which the moving direction of the shift lever and the moving direction of the corresponding sleeve do not agree with each other in the respective shifts that are the shift from the first speed to the second speed, the shift from the third speed to the fourth speed, and the shift from the fifth speed to the sixth speed.

The present invention is not limited to the above-mentioned embodiment, but various modifications are possible without departing from the scope of the present invention. For example, in the above-mentioned embodiment, the second intermediate shaft A3 shorter than the first intermediate shaft A2 is located above the first intermediate shaft A2 in a state in which the M/T is mounted to a vehicle (see FIG. 2). However, the second intermediate shaft A3 shorter than the first intermediate shaft A2 may be located below the first intermediate shaft A2 in a state in which the M/T is mounted to a vehicle.

In the above-mentioned embodiment, the final driven gear Gfo that is formed integral with the housing (casing) of the differential D/F is coaxially arranged to the output shaft A4. However, the final driven gear Gfo, which is not formed integral with the housing (casing) of the differential D/F, may directly and coaxially be fixed to the output shaft A4.

What is claimed is:

1. A vehicle manual transmission that is mounted to a power transmission system linking an output shaft of an engine of a vehicle and a drive wheel, and that has six shift stages for a forward travel and one shift stage for a reverse travel, comprising:
   a housing;
   an input shaft that is rotatably supported by the housing, and that forms a power transmission system with the output shaft of the engine, wherein first-speed to sixth-speed drive gears for the forward travel are respectively fixed to the input shaft coaxially in such a manner that the first-speed to sixth-speed drive gears cannot make relative rotation;
   a first intermediate shaft that is rotatably supported by the housing so as to be parallel to the input shaft at the position eccentric from the input shaft, wherein first-speed to fourth-speed driven gears for the forward travel, which are respectively always meshed with the first-speed to the fourth-speed drive gears for the forward travel, are coaxially arranged thereto in such a manner that the first-speed to fourth-speed drive gears can make relative rotation, and a first final drive gear is coaxially fixed thereto in such a manner that the first final drive gear cannot make relative rotation;
   a second intermediate shaft that is eccentric from the input shaft, and that is rotatably supported by the housing so as to be parallel to the input shaft at the position above or below the first intermediate shaft in a state in which the manual transmission is mounted to a vehicle, wherein fifth-speed and sixth-speed driven gears for the forward travel, which are respectively always meshed with the fifth-speed and the sixth-speed drive gears for the forward travel, are coaxially arranged thereto in such a manner that the fifth speed and sixth-speed driven gears can make relative rotation, a driven gear for a reverse travel, which is always meshed with a drive gear for the reverse travel that coaxially and integrally rotates with the first-speed driven gear for the forward travel, is coaxially arranged thereto in such a manner that the driven gear for the reverse travel can make relative rotation, and a second final drive gear is coaxially fixed thereto in such a manner that the second final drive gear cannot make relative rotation;
   an output shaft that is rotatably supported by the housing so as to be parallel to the input shaft at the position eccentric from the input shaft, and that forms a power transmission system with the drive wheel, wherein a final driven gear that is always meshed with the first and second final drive gears is coaxially arranged thereto;
   a first switching mechanism that can selectively employ one of a non-connected state in which the first-speed and second-speed driven gears can rotate relative to the first intermediate shaft, a first-speed state in which the first-speed driven gear cannot rotate relative to the first intermediate shaft and the second-speed driven gear can rotate relative to the first intermediate shaft, and a second-speed state in which the first-speed driven gear can rotate relative to the first intermediate shaft and the second-speed driven gear cannot rotate relative to the first intermediate shaft;
   a second switching mechanism that can selectively employ one of a non-connected state in which the third-speed and fourth-speed driven gears can rotate relative to the first intermediate shaft, a third-speed state in which the third-speed driven gear cannot rotate relative to the first intermediate shaft and the fourth-speed driven gear can rotate relative to the first intermediate shaft, and a fourth-speed state in which the third-speed driven gear can rotate relative to the first intermediate shaft and the fourth-speed driven gear cannot rotate relative to the first intermediate shaft;
   a third switching mechanism that can selectively employ one of a non-connected state in which the fifth-speed and sixth-speed driven gears can rotate relative to the second intermediate shaft, a fifth-speed state in which the fifth-speed driven gear cannot rotate relative to the second intermediate shaft and the sixth-speed driven gear can rotate relative to the second intermediate shaft, and a sixth-speed state in which the fifth-speed driven gear can rotate relative to the second intermediate shaft and the sixth-speed driven gear cannot rotate relative to the second intermediate shaft; and
   a fourth switching mechanism that can selectively employ one of a non-connected state in which the driven gear for the reverse travel can rotate relative to the second intermediate shaft, and a reverse state in which the driven gear for the reverse travel cannot rotate relative to the second intermediate shaft, wherein
   a single drive gear, that is coaxially fixed to the input shaft in such a manner that the single drive gear cannot rotate relative to the input shaft, is used as both the fourth-speed drive gear and the sixth-speed drive gear,
   the number of the gear teeth of the second final drive gear is greater than the number of the gear teeth of the first final drive gear,
   the third-speed driven gear, the fourth-speed driven gear, the first-speed driven gear, and the second-speed driven gear are arranged in this order from the side close to the engine in the axial direction of the first intermediate shaft, in a state in which the manual transmission is mounted to the vehicle, and
   the fifth-speed driven gear, the sixth-speed driven gear, and the driven gear for the reverse travel are arranged in this order in the axial direction of the second intermediate shaft from the side close to the engine, in a state in which the manual transmission is mounted to the vehicle.

2. A vehicle manual transmission according to claim 1, wherein the drive gear for the reverse travel is arranged between the first-speed driven gear and the fourth-speed driven gear in the axial direction of the first intermediate shaft.

3. A vehicle manual transmission according to claim 1, wherein
   the first final drive gear is arranged at the side closer to the engine than the third-speed driven gear in the axial direction of the first intermediate shaft in a state in which the manual transmission is mounted to the vehicle, and the second final drive gear is arranged at the side closer to the engine than the fifth-speed driven gear in the axial direction of the second intermediate shaft in a state in which the manual transmission is mounted to the vehicle.

4. A vehicle manual transmission according to claim 2, wherein the first final drive gear is arranged at the side closer to the engine than the third-speed driven gear in the axial direction of the first intermediate shaft in a state in which the manual transmission is mounted to the vehicle, and the second final drive gear is arranged at the side closer to the engine than the fifth-speed driven gear in the axial direction of the second intermediate shaft in a state in which the manual transmission is mounted to the vehicle.

\* \* \* \* \*